US011092717B2

(12) United States Patent
Capasso et al.

(10) Patent No.: US 11,092,717 B2
(45) Date of Patent: Aug. 17, 2021

(54) META-LENSES FOR SUB-WAVELENGTH RESOLUTION IMAGING

(71) Applicant: PRESIDENT AND FELLOWS OF HARVARD COLLEGE, Cambridge, MA (US)

(72) Inventors: Federico Capasso, Cambridge, MA (US); Wei-Ting Chen, Cambridge, MA (US); Robert C. Devlin, Cambridge, MA (US); Mohammadreza Khorasaninejad, Cambridge, MA (US); Jaewon Oh, Cambridge, MA (US); Alexander Yutong Zhu, Cambridge, MA (US); Charles Roques-Carmes, Cambridge, MA (US); Ishan Mishra, Cambridge, MA (US)

(73) Assignee: PRESIDENT AND FELLOWS OF HARVARD COLLEGE, Cambridge, MA (US)

( * ) Notice: Subject to any disclaimer, the term of this patent is extended or adjusted under 35 U.S.C. 154(b) by 353 days.

(21) Appl. No.: 16/091,104

(22) PCT Filed: Apr. 5, 2017

(86) PCT No.: PCT/US2017/026206
§ 371 (c)(1),
(2) Date: Oct. 3, 2018

(87) PCT Pub. No.: WO2017/176921
PCT Pub. Date: Oct. 12, 2017

(65) Prior Publication Data
US 2019/0154877 A1    May 23, 2019

Related U.S. Application Data

(60) Provisional application No. 62/397,854, filed on Sep. 21, 2017, provisional application No. 62/318,649, filed on Apr. 5, 2016.

(51) Int. Cl.
G02B 1/00 (2006.01)
G02B 3/08 (2006.01)
(Continued)

(52) U.S. Cl.
CPC ............... *G02B 1/002* (2013.01); *G02B 1/00* (2013.01); *G02B 3/02* (2013.01); *G02B 3/08* (2013.01);
(Continued)

(58) Field of Classification Search
CPC . G02B 1/00; G02B 1/002; G02B 3/02; G02B 3/08; G02B 5/18; G02B 5/1809; G02B 2207/101
See application file for complete search history.

(56) References Cited

U.S. PATENT DOCUMENTS 8,681,428 B1    3/2014 Brown
8,912,973 B2 *  12/2014 Werner .................. H01Q 15/02
                                              343/853
(Continued)

FOREIGN PATENT DOCUMENTS

CN    101158727 A    4/2008
CN    204422813 U    6/2015
(Continued)

OTHER PUBLICATIONS

Byrnes ("Designing large, high-efficiency, high-numerical aperture, transmissive meta-lenses for visible light" Optics Express Vo. 24 , No. 5, p. 511-=5124. Published online Mar. 1, 2016). (Year: 2016).*
(Continued)

*Primary Examiner* — Jack Dinh
(74) *Attorney, Agent, or Firm* — Foley & Lardner LLP

(57) ABSTRACT

A meta-lens having a phase profile includes a substrate and a plurality of nanostructures disposed on the substrate. Each individual nanostructure of the nanostructures imparts a
(Continued)

light phase shift that varies depending on a location of the individual nanostructure on the substrate. The light phase shifts of the nanostructures define the phase profile of the meta-lens. The varying light phase shifts can be realized by, e.g., changing orientations of nanofins or changing diameters of nanopillars.

23 Claims, 21 Drawing Sheets

(51) Int. Cl.
   *G02B 5/18* (2006.01)
   *G02B 3/02* (2006.01)
(52) U.S. Cl.
   CPC .............. *G02B 5/18* (2013.01); *G02B 5/1809* (2013.01); *G02B 2207/101* (2013.01)

(56) References Cited

U.S. PATENT DOCUMENTS

| | | | | |
|---|---|---|---|---|
| 2012/0328240 | A1* | 12/2012 | Ma | G02B 1/002 385/33 |
| 2015/0090862 | A1 | 4/2015 | Matsui et al. | |
| 2016/0025914 | A1 | 1/2016 | Brongersma et al. | |

FOREIGN PATENT DOCUMENTS

| | | |
|---|---|---|
| CN | 104932043 A | 9/2015 |
| CN | 105068396 A | 11/2015 |
| CN | 105223689 A | 1/2016 |
| CN | 105278026 A | 1/2016 |
| CN | 105278309 A | 1/2016 |
| JP | 2005-274847 A | 10/2005 |
| JP | 2015-092234 A | 5/2015 |

OTHER PUBLICATIONS

Aieta et al. ("Aberration-Free Ultrathin Flat Lenses and Axicons at Telecom Wavelengths 5, 6, 10 Based on Plasmonic Metasurfaces". Nano Letters, vol. 12, issue 9, pp. 4932-4936. Aug. 15, 2012.) (Year: 2012).*

Aieta, Francesco et al., "Aberration-Free Ultrathin Flat Lenses and Axicons at Telecom Wavelengths Based on Plasmonic Metasurfaces", Nano Letters, vol. 12, Issue 9, Aug. 15, 2012, pp. 4932-4936.

Byrnes, Steven J., et al., "Designing large, high-efficiency, high-numerical-aperture, transmissive meta-lenses for visible light", Optics Express, vol. 24, No. 5, Mar. 7, 2016, 15 pages.

International Search Report and Written Opinion for International Patent Application No. PCT/US2017/26206, dated Jun. 28, 2017, 11 pages.

Khorasaninejad, M. et al., "Planar Lenses at Visible Wavelengths", Arxiv, https://arxiv.org/ftp/arxiv/papers/1605/1605.02248.pdf, May 7, 2016, 17 pages.

Khorasaninejad, M. et al., "Super-Dispersive Off-Axis Meta-Lenses for Compact High Resolution Spectroscopy", Nano Letters, vol. 16, Issue 6, Apr. 27, 2016, pp. 3732-3737.

Arbabi, Amir et al., "Subwavelength-thick lenses with high numerical apertures and large efficiency based on high-contrast transmitarrays", Nature Communications, May 7, 2015, 6 pages.

Office Action for corresponding China Patent Application No. 201780031669.9, dated Mar. 4, 2020, 23 pages (includes English translation).

Search Report for corresponding China Patent Application No. 201780031669.9, dated Mar. 4, 2020, 6 pages (includes English translation).

Search Report and Written Opinion for corresponding Singapore Patent Application No. 11201808772W, 12 pages.

Vo, Sonny et al., "Sub-Wavelength Grating Lenses With a Twist", IEEE Photonics Technology Letters, vol. 26, No. 13, Jul. 1, 2014, pp. 1375-1378.

Devlin, Robert C., et al., "High efficiency dielectric metasurfaces at visible wavelengths", Mar. 8, 2016, 18 pages, https://arxiv.org/ftp/arxiv/papers/1603/1603.02735.pdf, DOI: 10.1073/pnas.1611740113.

Extended Search Report for EP Application No. 17779772.7, dated Oct. 25, 2019, 10 pages.

2nd Examination Report/Written Opinion for corresponding Singapore Patent Application No. 11201808772W, dated Nov. 13, 2020, 7 pages.

2nd Office Action for corresponding China Patent Application No. 201780031669.9, dated Sep. 11, 2020, 20 pages (with English translation).

3rd Office Action for corresponding China Patent Application No. 201780031669.9, dated Feb. 4, 2021, 21 pages (with English translation).

Office Action for corresponding Japanese Patent Application No. 2018-552199, dated Mar. 8, 2021, 17 pages with English translation.

Preliminary Rejection for corresponding Korean Patent Application No. 10-2018-7030264, dated Apr. 19, 2021, (includes English translation), 14 pages.

* cited by examiner

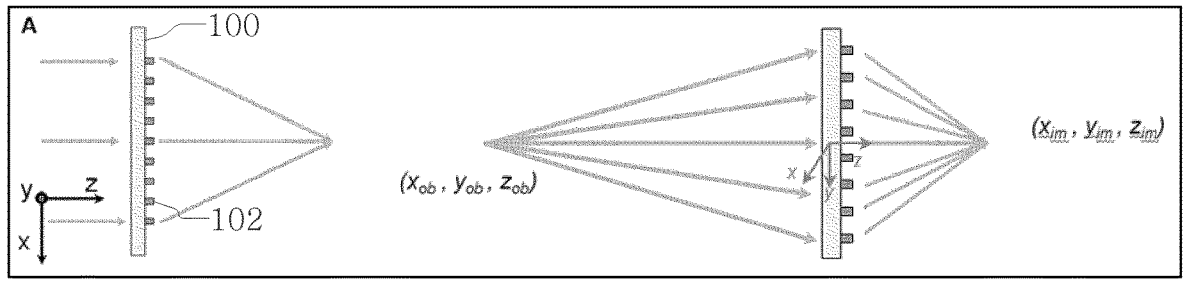
FIG. 1A
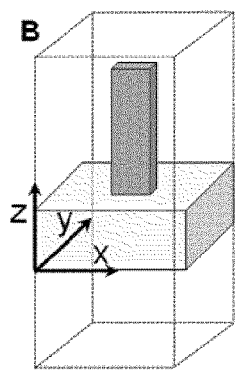
FIG. 1B
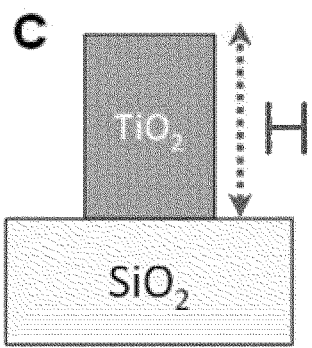 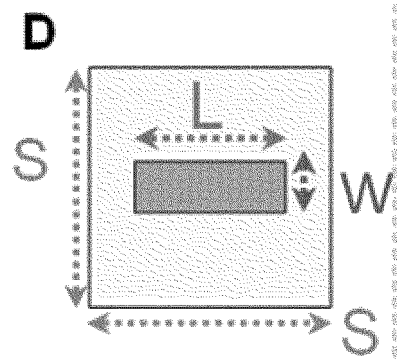 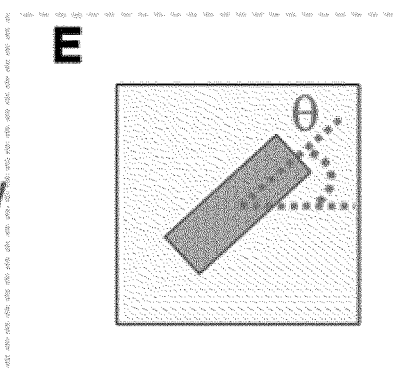
FIG. 1C     FIG. 1D     FIG. 1E

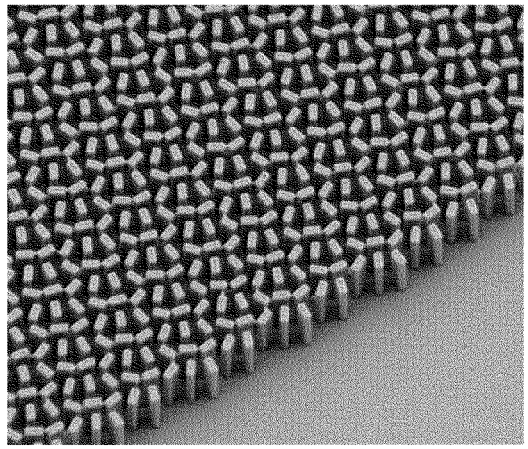
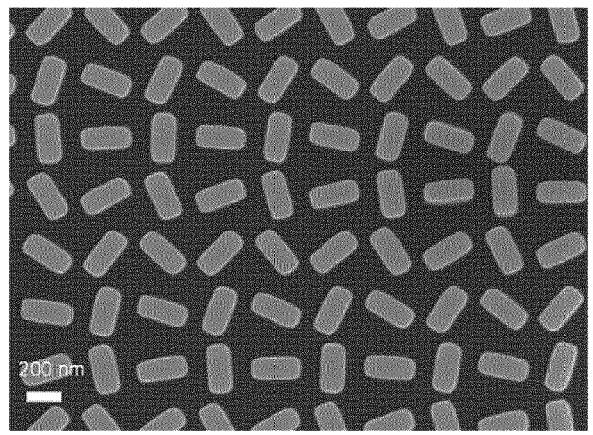
FIG. 1I    FIG. 1J
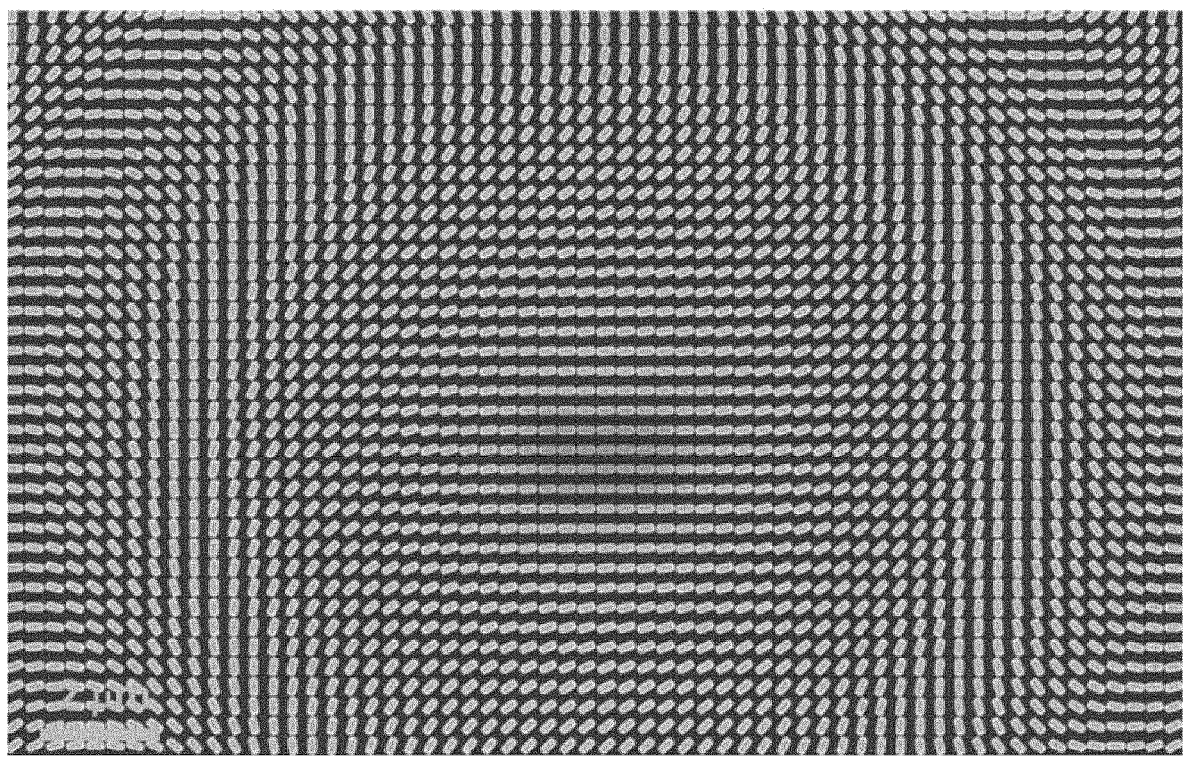
FIG. 1K

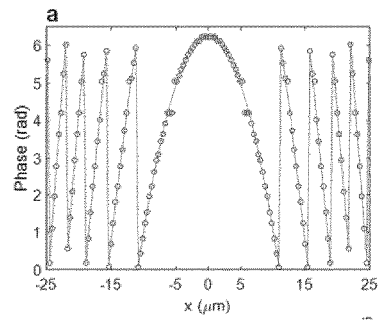 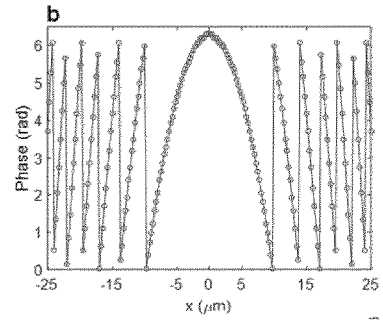 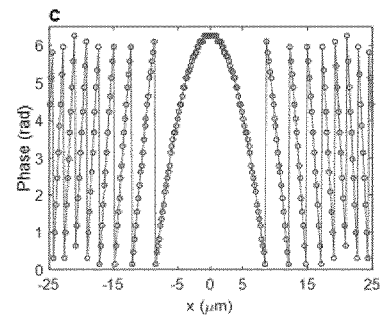
FIG. 12A    FIG. 12B    FIG. 12C
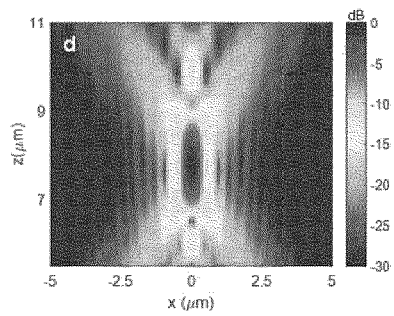 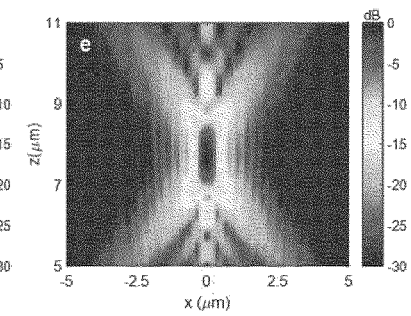 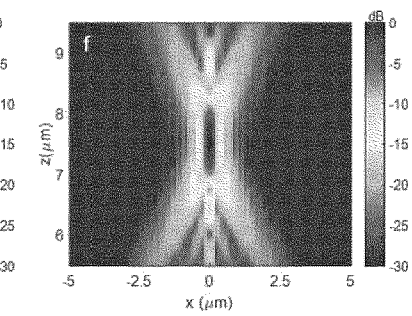
FIG. 12D    FIG. 12E    FIG. 12F

META-LENSES FOR SUB-WAVELENGTH RESOLUTION IMAGING

CROSS-REFERENCE TO RELATED APPLICATIONS

This application is a National Stage Entry of International Application No. PCT/US2017/026206, filed Apr. 5, 2017, which claims the benefit of and priority to U.S. Provisional Patent Application No. 62/318,649, filed Apr. 5, 2016, and U.S. Provisional Patent Application No. 62/397,854, filed Sep. 21, 2016, all of which are incorporated herein by reference in their entireties.

STATEMENT OF FEDERALLY SPONSORED RESEARCH OR DEVELOPMENT

This invention is made with Government support under FA9550-14-1-0389 and FA9550-16-1-0156, awarded by the Air Force Office of Scientific Research. The Government has certain rights in the invention.

BACKGROUND

Sub-wavelength resolution imaging techniques allow images to be taken with a resolution that transcends the light wavelength limitation. The optical systems using the sub-wavelength resolution imaging techniques typically specifies optical lenses having high numeral apertures (NAs), which are conventionally bulky and expensive.

SUMMARY

In this disclosure, highly efficient, planar lenses having metasurfaces (hereinafter "meta-lenses") at the visible spectrum (e.g., red, green and blue wavelengths (wavelength X of 660 nanometers (nm), 532 nm and 405 nm, respectively)) are disclosed. The metasurfaces allow the miniaturization of the planar lenses. The planar meta-lenses may be polarization insensitive or polarization sensitive.

According to some embodiments of the present disclosure, the meta-lenses include high-aspect-ratio titanium dioxide metasurfaces, which solution simultaneously satisfies the demands for high NA and high focusing efficiency. For example, meta-lenses with NA of about 0.8 and diffraction-limited focusing are disclosed to focus light at wavelengths of about 405 nm, about 532 nm, and about 660 nm, with respective efficiencies of about 86%, about 73%, and about 66%.

According to some embodiments of the present disclosure, meta-lenses with numerical apertures of about 0.85 and about 0.6 and corresponding efficiencies as high as about 60% and about 90% may be achieved. These meta-lenses may be less than about 600 nm thick and can focus incident light down to diffraction-limited spots as small as about 0.64λ, and provide high-resolution imaging.

These meta-lenses resolve nanoscale features separated by sub-wavelength distances and provide large magnifications up to magnification of about 170× with image qualities suitable for commercial and industrial applications. Accordingly, the meta-lenses described with respect to embodiments in the present disclosure can have widespread applications in laser-based microscopy, imaging, and spectroscopy, among other uses. In particular, the meta-lenses can achieve highly symmetric focal spots, with high Strehl ratios. Such meta-lenses allow a single-step lithography process and are compatible with large-scale fabrication processes.

It should be understood that the techniques of the present disclosure may be used to achieve meta-lenses with higher NA (e.g., higher than about 0.8). It should be understood that meta-lenses with a lower NA (e.g., lower than about 0.8) are further within the scope of the present disclosure, and the techniques described in the present disclosure are applicable to such meta-lenses. It should be further understood that, although certain types of meta-lenses (e.g., spherical or infinity-corrected, or point-to-point or bi-convex) are described below, a meta-lens with any desired phase profile may be implemented and is within the scope of the present disclosure. Further, combinations of phase profiles may be implemented in a meta-lens.

As used herein, the term "visible spectrum" refers to wavelengths visible to humans. The term encompasses an entire range of wavelengths visible across the human population. It is to be understood, however, that this range will vary between specific humans. For example, the visible spectrum may encompass wavelengths between about 400 nm to about 700 nm. Additionally, the meta-lenses described herein may be optimized for certain subranges of the visible spectrum, or for certain ranges out of the visible spectrum (e.g., infrared (IR) or near-infrared (NIR) spectrums).

In an aspect according to some embodiments, a meta-lens having a phase profile includes a substrate and a plurality of nanostructures disposed on the substrate. Each individual nanostructure of the nanostructures imparts a light phase shift that varies depending on a location of the individual nanostructure on the substrate. The light phase shifts of the nanostructures define the phase profile of the meta-lens.

In some embodiments, the light phase shift of each individual nanostructure of the nanostructures depends on the location of the individual nanostructure on the substrate and a size or an orientation of the individual nanostructure (or depends on other design parameter(s) of the nanostructure).

In some embodiments, the nanostructures are high-aspect-ratio nanostructures.

In some embodiments, the nanostructures include nanofins, and the light phase shift of each individual nanofin of the nanofins depends on the location of the individual nanofin on the substrate and an orientation of the individual nanofin.

In some embodiments, an individual nanofin is located at an (x, y) coordinate in an x-y plane of the substrate, the individual nanofin is rotated by a defined angle with respect to an axis in the x-y plane, and the defined angle $\theta_{nf}(x, y)$ of the individual nanofin is determined by $$\theta_{nf}(x, y) = \frac{\pi}{\lambda_d}\left(f - \sqrt{x^2 + y^2 + f^2}\right),$$

where $\lambda_d$ is a designed wavelength of the meta-lens and f is a designed focal point of the meta-lens.

In some embodiments, the phase profile of the meta-lens is an infinity-corrected lens phase profile.

In some embodiments, each nanofin has a rectangular cross-section, with an aspect ratio of at least about 2:1.

In some embodiments, each nanofin is formed of a high index dielectric, the index being greater than approximately 2.

In some embodiments, the dielectric is titanium dioxide.

In some embodiments, a numerical aperture of the meta-lens is less than or equal to 0.8.

In some embodiments, the meta-lens has a focusing efficiency of greater than about 50% for visible spectrum wavelengths.

In some embodiments, the meta-lens is configured to resolve features with sub-wavelength gaps of about $$\left(\frac{\lambda}{2 \times NA}\right),$$

where λ is a designed wavelength of the meta-lens and NA is a numeral aperture of the meta-lens.

In some embodiments, the nanostructures include nanopillars, and the light phase shift of each individual nanopillar of the nanopillars depends on the location of the individual nanopillar on the substrate and a size of the individual nanopillar.

In some embodiments, the nanostructures include nanopillars, and the light phase shift of each individual nanopillar of the nanopillars is $$\varphi_t(x, y) = 2\pi - \frac{2\pi}{\lambda_d}\left(\sqrt{x^2 + y^2 + f^2} - f\right),$$

where $\lambda_d$ is a designed wavelength of the meta-lens and f is a designed focal length of the meta-lens.

In some embodiments, the light phase shift of the individual nanopillar is realized by adjusting a diameter of the individual nanopillar.

In some embodiments, a height of the individual nanopillar is greater than a designed wavelength of the meta-lens.

In some embodiments, a unit cell size U of the nanopillar on the substrate meets a criterion of $$\left(U < \frac{\lambda}{2NA}\right),$$

where λ is a designed wavelength of the meta-lens and NA is a designed numerical aperture of the meta-lens.

In another aspect according to some embodiments, a meta-lens includes a substrate and a plurality of nanostructures disposed on the substrate. Each individual nanostructure of the nanostructures imparts a phase profile that varies depending on a location of the individual nanostructure on the substrate and at least one property of the individual nanostructure.

In some embodiments, the phase profiles of the nanostructures that vary are realized by varying orientations of the nanostructures, dimensions of the nanostructures, sizes of the nanostructures, aspect ratios of the nanostructures, materials of the nanostructures, spatial arrangement of the nanostructures, shapes of the nanostructures, or a combination of two or more thereof.

In some embodiments, the meta-lens has a phase profile of a spherical lens, an infinity-corrected lens, a point-to-point lens, or a bi-convex lens. In some embodiments, the meta-lens can be configured to focus collimated light to a point, focus collimated light to a line, focus uncollimated light to a point, focus uncollimated light to a line, focus light from a point to a point, focus light from a spot to a spot, or focus light from a line to a line.

In some embodiments, the nanostructures include nanofins, each individual nanofin of the nanofins imparts a phase profile that varies depending on a location of the individual nanofin on the substrate and an orientation of the individual nanofin, and the phase profiles of the nanofins define a polarization sensitive phase profile of the meta-lens.

In some embodiments, the nanostructures include nanopillars, each individual nanopillar of the nanopillars imparts a phase profile that varies depending on a location of the individual nanopillar on the substrate and a diameter of the individual nanopillar, and the phase profiles of the nanopillars define a polarization insensitive phase profile of the meta-lens.

In yet another aspect according to some embodiments, an optical system includes an optical component and a first planar meta-lens optically coupled to the optical component. The first planar meta-lens includes a first substrate and a plurality of first nanostructures disposed on the substrate. Each individual first nanostructure of the first nanostructures imparts a phase profile that varies depending on a location of the individual first nanostructure on the substrate and at least one property of the individual first nanostructure.

In some embodiments, the optical component is a second planar meta-lens. The second planar meta-lens includes a second substrate and a plurality of second nanostructures disposed on the second substrate. Each individual second nanostructure of the second nanostructures imparts a phase profile that varies depending on a location of the individual second nanostructure on the second substrate and at least one property of the individual second nanostructure.

In some embodiments, the second substrate with the second nanostructures is stacked on the first substrate with the first nanostructures, and a phase profile of the first planar meta-lens is different from a phase profile of the second planar meta-lens.

In some embodiments, the second planar meta-lens is configured to correct for an aberration of the first planar meta-lens.

Other aspects and embodiments of this disclosure are also contemplated. The foregoing summary and the following detailed description are not meant to restrict this disclosure to any particular embodiment but are merely meant to describe some embodiments of this disclosure.

BRIEF DESCRIPTION OF THE DRAWINGS

For a better understanding of the nature and objects of some embodiments of this disclosure, reference should be made to the following detailed description taken in conjunction with the accompanying drawings.

FIG. 1A illustrates cross-sectional views of two examples of meta-lenses.

FIG. 1B illustrates a perspective view of a nanofin.

FIG. 1C illustrates a side view of a nanofin.

FIG. 1D illustrates a top view of a nanofin.

FIG. 1E illustrates a top view of another nanofin with a different rotation angle.

FIG. 1I is a scanning electron micrograph image of a portion of a meta-lens.

FIG. 1J is a scanning electron micrograph image of a portion of a meta-lens.

FIG. 1K is a scanning electron micrograph image of a portion of a meta-lens.

FIG. 12A illustrates a simulated phase profile of a meta-lens having an NA of about 0.85 at a design wavelength of about 660 nm.

FIG. 12B illustrates a simulated phase profile of a meta-lens having an NA of about 0.85 at a design wavelength of about 532 nm.

FIG. 12C illustrates a simulated phase profile of a meta-lens having an NA of about 0.85 at a design wavelength of about 405 nm.

FIG. 12D illustrates a simulated intensity distribution of the meta-lens illustrated in FIG. 12A in the focal region at an x-z plane.

FIG. 12E illustrates a simulated intensity distribution of the meta-lens illustrated in FIG. 12B in the focal region at an x-z plane.

FIG. 12F illustrates a simulated intensity distribution of the meta-lens illustrated in FIG. 12C in the focal region at an x-z plane.

DETAILED DESCRIPTION

Figure 1F:
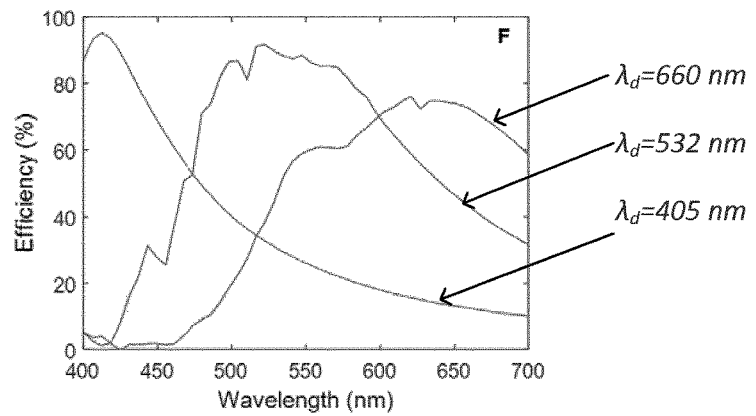
FIG. 1F is a diagram illustrating meta-lens simulated efficiency versus wavelength.

Conventional high NA devices include precision-engineered compound lenses that are bulky and expensive (e.g., costing upwards of thousands of U.S. dollars). The bulky and expensive compound lenses limit the type of applications that can implement using such conventional high NA devices and hinders their integration into compact and cost-effective systems. In addition, high NA and efficiency are not attainable by way of visible planar diffractive lenses because the cross-sections of constituent structures are in wavelength scale which precludes an accurate phase profile.

Metasurfaces have emerged as one of the leading platforms for development of miniaturized optical components. Meta-lenses include metasurfaces having sub-wavelength-spaced phase shifters with advanced control over the properties of light, and allow for versatile functionalities in planar structures of the meta-lenses. There has been considerable effort in the development of meta-lenses. Various optical components ranging from lenses, holograms and gratings to polarization-selective devices have been demonstrated using silicon-based and plasmonic metasurfaces. However, efficient operation ranges of meta-lenses to date have been in near-infrared (NIR) spectrums. Achieving highly efficient meta-lenses in the visible spectrum poses challenges. The high intrinsic optical losses of silicon and plasmonic materials of the metasurfaces in the visible spectral range (approximately 400 nm to approximately 700 nm) have prevented the realization of high efficiency metasurfaces in this region.

Achieving highly efficient meta-lenses demands full control over the phase of light through precisely fabricated, high-aspect-ratio nanostructures. However, the development of such precisely fabricated, high-aspect-ratio nanostructures are subject to availability of nanofabrication techniques. For instance, dielectrics with a transparency window in the visible spectrum may be used as alternative materials of the metasurfaces. However, achieving high-aspect-ratio sub-wavelength structures with vertical sidewalls is challenging for these dielectric materials using conventional top-down fabrication processes (e.g., lithography followed by dry etching). Non-vertical walls can result in performance degradation. Titanium dioxide ($TiO_2$) diffractive elements are also used to fabricate blazed gratings at visible wavelengths (e.g., about 633 nm) through a dry etching process. A $TiO_2$-based lens (NA of about 0.25) can be built at NIR wavelengths (e.g., about 860 nm) but the lens experiences similar difficulties with tapered wall profiles as well as surface roughness, which are commonly associated with this technique. The surface roughness contributes to scattering losses and the tapered wall profile results in errors in the realized phase.

In at least some embodiments of the present disclosure, transmissive meta-lenses with high-aspect-ratio nanostructures can achieve high NA and optical efficiency in the visible range. The metasurfaces including high-aspect-ratio nanostructures with relatively smooth surfaces are achieved by a fabrication approach based on titanium dioxide ($TiO_2$) prepared by atomic layer deposition (ALD). The $TiO_2$ may be, e.g., amorphous $TiO_2$. The use of ALD avoids the aforementioned difficulties with dry etching and allows for using high quality amorphous $TiO_2$ with negligible material and scattering loss. The high-aspect-ratio metasurfaces fabricated using this approach are substantially lossless in the visible spectrum. Based on this fabrication approach, transmissive planar lenses (meta-lenses) can be achieved. The meta-lenses can be polarization-sensitive or polarization-insensitive.

In some embodiment, the meta-lenses can operate at, e.g., red (about 660 nm), green (about 532 nm) and blue (about 405 nm) wavelengths with respective efficiencies of about 66%, about 73%, and about 86%. In some embodiments, meta-lenses with NA of about 0.6 and about 0.85 can achieve focusing efficiencies up to, e.g., about 90% and about 60%, respectively. These lenses are capable of focusing light into diffraction-limited spots. At their respective design wavelengths, these focal spots may, e.g., approximately 1.5 times smaller than those from a commercially available, conventional high NA device (e.g., Nikon model CFI60 with magnification of 100× and NA of 0.8). The meta-lenses can yield sub-wavelength resolution, with image qualities comparable to or superior to that obtained by the conventional commercial device. It is to be understood that the term "design" or "designed" (e.g., as used in "design wavelength," "design focal length" or other similar phrases below) refers to parameters set during a design phase; which parameters after fabrication may have an associated tolerance.

It should be understood that the techniques of the present disclosure to provide high NA and efficiency is inclusive of providing lower NA and efficiency. In other words, if the meta-lens design technique is capable of achieving NA=0.8, then the meta-lens design technique is capable of achieving NA<0.8, such as NA=0.5 or NA=0.1, or other NA suitable for the design.

In some embodiments, in addition to $TiO_2$, other suitable dielectric materials include those having a light transmittance over the visible spectrum of at least about 40%, at least about 50%, at least about 60%, at least about 70%, at least about 80%, at least about 85%, at least about 90%, or at least about 95%. For example, other suitable dielectric materials can be selected from oxides (such as an oxide of aluminum (e.g., $Al_2O_3$), silicon (e.g., $SiO_2$), hafnium (e.g., $HfO_2$), zinc (e.g., ZnO), magnesium (e.g., MgO), or titanium (e.g., TiO$_2$)), nitrides (such as nitrides of silicon (e.g., Si$_3$N$_4$), boron (e.g., BN), or tungsten (e.g., WN)), sulfides and pure elements. Aspect ratios of metasurfaces (e.g., a ratio of height to width of a nanofin or a ratio of height to diameter of a nanopillar) can be greater than one, at least about 1.5:1, at least about 2:1, at least about 3:1, at least about 4:1, at least about 5:1, at least about 6:1, or at least about 10:1.

In some embodiments, a method of fabricating a visible spectrum meta-lens involves ALD and etching. For example, the method can include providing a substrate. The method further includes applying a resist on a surface of the substrate and patterning the resist by, e.g., optical lithography, electron beam lithography, nano-imprinting, or etching the resist. The pattern defines openings in the resist, which expose portions of the surface of the substrate. The method includes forming a conformal coating, such as by atomic layer deposition (ALD), on the resist and the portions of the surface of the substrate exposed in the openings. The conformal coating forms the metasurfaces including nanostructures. The top surface of the conformal coating is above a top surface of the resist. The method includes removing a top portion of the conformal coating by, e.g., etching the conformal coating to expose the resist. The method further includes removing the resist to expose the metasurfaces including the nanostructures (e.g., nanofins or nanopillars).

In some embodiments, meta-lenses can include nanofins or nanopillars (or other nanostructures) that are formed of, or include, TiO$_2$ (or other materials). The meta-lens can achieve a high NA (of, e.g., 0.8 or higher) and a high conversion efficiency (of, e.g., 86% or higher) at a visible spectrum (or other spectrums). Such meta-lenses can provide diffraction-limited focal spots at arbitrary design wavelengths, and can be used in various applications such as optical lithography, laser-based microscopy, and spectroscopy. The meta-lens can provide, e.g., a magnification of 170× or higher and can optically resolve structures as small as features with sub-wavelength spacing. In some embodiments, the single-layer lithographic fabric100ation of the meta-lenses can use technologies such as deep UV steppers, and accordingly can facilitate high manufacturing throughput.

In some embodiments, the ultra-thin and compact features of these planar meta-lenses together with their straightforward fabrication can be used in achieving miniaturized and lightweight optical systems. The technology will allow a host of cost-effective solutions for versatile applications ranging from imaging, spectroscopy and laser fabrication to wearable optics. For instance, the compact configuration of the meta-lens can be suitable for portable or handheld instruments for many applications. For example, the meta-lens may be used in cellphones, cameras, portable computers, microscopes, virtual reality devices, augmented reality devices, and other devices.

Structures of Meta-Lenses Including Nanofins

FIG. 1A diagrammatically illustrates cross sections in an x-z plane of two examples of transmissive dielectric meta-lenses. Each meta-lens includes a substrate 100 and multiple nanostructures 102 disposed on the substrate 100. On the left is a meta-lens designed for an infinity-corrected lens phase profile, and on the right is a meta-lens designed for a bi-convex lens phase profile. It should be further understood that, although certain types of meta-lenses are described here, a meta-lens with any desired phase profile may be implemented and is within the scope of the present disclosure. The building blocks of the meta-lenses of FIG. 1A include high-aspect-ratio TiO$_2$ nanofins. Here nanofins are illustrated by way of example. Other geometries may alternatively or additionally be used that satisfy the conditions of being anisotropic with high-aspect-ratio. Although the nanofins are shown with a rectangular cross sectional shape, other shapes are encompassed by embodiments of this disclosure, such as square-shaped, triangular, and other polygonal or non-polygonal shapes that can impart a desired phase profile.

FIGS. 1B, 1C and 1D are, respectively, perspective, side, and top views of examples of nanofins. In the embodiment illustrated in FIG. 1C, the nanofins are formed on a silicon dioxide (SiO$_2$) substrate. In other embodiments, other substrates can be used. A unit cell area for each nanofin is defined as an S×S area encompassing the nanofin in the x, y plane, as shown in FIG. 1D.

In some embodiments, such as the meta-lens illustrated on the left side of FIG. 1A, the meta-lens functions like a spherical lens. The meta-lens according to this embodiment has a phase profile $\varphi(x, y)$ that meets the constraints of equation (1) representing an infinity-corrected lens phase profile, where is the design wavelength, x and y are the coordinates of each nanofin within the meta-lens and f is the focal length. The coordinates in the x,y plane is illustrated in FIG. 1B.

$$\varphi(x, y) = \frac{2\pi}{\lambda_d}(f - \sqrt{x^2 + y^2 + f^2}) \qquad (1)$$

In some other embodiments, meta-lenses can function as other types of lenses rather than, or in addition to, a spherical lens. For example, in an embodiment as illustrated on the right side of the FIG. 1A, the meta-lens functions as a bi-convex lens with a phase profile $\varphi_d(x, y, z)$ that meets the constraints of equation (2).

$$\begin{cases} \varphi_d(x, y, z) = \frac{2\pi}{\lambda_d}(f - (\Delta D_{ob} + \Delta D_i)) \\ \Delta D_{ob} = \sqrt{(x - x_{ob})^2 + (y - y_{ob})^2 + (z - z_{ob})^2} \\ \Delta D_i = \sqrt{(x - x_{im})^2 + (y - y_{im})^2 + (z - z_{im})^2} \\ f = f_1 + f_2 \\ f_1 = \sqrt{x_{ob}^2 + y_{ob}^2 + z_{ob}^2} \\ f_2 = \sqrt{x_{im}^2 + y_{im}^2 + z_{im}^2} \end{cases} \qquad (2)$$

Implementation of the phase profile in the meta-lens can be explained by way of example with respect to equation (1). The phase profile of equation (1) is imparted via rotation of each individual nanofin by an angle θ from a selected axis (e.g., either rotation with respect to the x axis or rotation with respect to the y axis, and θ for all nanofins is with respect to the same axis). As shown in the top view of a nanofin in FIG. 1E, a rotation θ of a nanofin at a given coordinate (x, y) is indicated as $\theta_{nf}(x, y)$. In the case of right-handed circularly polarized incident light, the rotations yield a phase shift of $\varphi_{nf}(x, y) = 2\theta_{nf}(x, y)$ accompanied by polarization conversion to left-handed circularly polarized light. Thus, each nanofin at (x, y) is rotated by an angle $\varphi_{nf}(x, y)$ as shown in equation (3).

$$\theta_{nf}(x, y) = \frac{\pi}{\lambda_d}(f - \sqrt{x^2 + y^2 + f^2}) \qquad (3)$$

For the bi-convex lens phase profile of equation (2), the rotation of the nanofins is by an angle as shown in equation (4) with respect to the illustration on the right side of FIG. 1A.

$$\theta_{nf}(x, y) = \frac{\pi}{\lambda_d}(f - (\Delta D_{ob} + \Delta D_i)) \quad (4)$$

In some embodiments, to improve or maximize polarization conversion efficiency, the nanofins may operate as half-waveplates, which can be achieved by birefringence arising from the asymmetric cross section of nanofins with appropriately designed height, width, and length (e.g., as defined in FIGS. 1C and 1D). In some embodiments, a cross section of nanofins can have a 2-fold rotational symmetry, or more generally, an n-fold rotational symmetry where n is an integer that is 2 or greater than 2. In some embodiments, a first nanofin can be substantially aligned with a selected axis (e.g., a rotation θ of the first nanofin is zero), and a second nanofin can be rotated with respect to the selected axis and with respect to the first nanofin by an angle θ that is at least about ±5°, at least about ±10°, at least about ±15°, or at least about ±20°.

FIG. 1F illustrates results of simulations for optimizing nanofin parameters at three design wavelengths. The simulations can use, e.g., a finite difference time domain (FDTD) solver. The three simulated meta-lenses are designed for wavelengths $\lambda_d$=660 nm, $\lambda_d$=532 nm, and $\lambda_d$=405 nm, where $\lambda_d$ indicates design wavelength. For the simulations, periodic boundary conditions are applied at the x- and y-boundaries, and perfectly matched layers (PMLs) at the z-boundaries. For the simulated meta-lens designed for $\lambda_d$=660 nm, the nanofins have, e.g., dimensions of approximately W=85 nm, L=410 nm, and H=600 nm, with center-to-center spacing of approximately S=430 nm. For the simulated meta-lens designed for $\lambda_d$=532 nm, the nanofins have, e.g., dimensions of approximately W=95 nm, L=250 nm, and H=600 nm, with center-to-center spacing of approximately S=325 nm. For the simulated meta-lens designed at $\lambda_d$=405 nm, the nanofins have, e.g., dimensions of approximately W=40 nm, L=150 nm, and H=600 nm, with center-to-center spacing of approximately S=200 nm.

As shown in FIG. 1F, conversion efficiencies as high as 95% are achieved for the different designs, illustrating that a meta-lens can be designed for a desired wavelength by tuning of nanofin parameters. The term conversion efficiency as used in this example is defined as a fraction of the incident circularly polarized optical power that is converted to transmitted optical power with opposite helicity.

In some embodiments, three meta-lenses are fabricated. The three fabricated meta-lenses are designed for wavelengths $\lambda_d$=660 nm, $\lambda_d$=532 nm, and $\lambda_d$=405 nm. Each meta-lens has a diameter of, e.g., approximately 240 micrometers (μm) and a focal length of, e.g., approximately 90 μm, yielding an NA of about 0.8. In some embodiments, electron beam lithography techniques can be used to create a lens pattern in the resist, where a thickness of the resist can be substantially equal to the designed nanofin height, H. ALD can be then used to deposit amorphous $TiO_2$ onto the developed resist. Amorphous $TiO_2$ can be chosen because it has low surface roughness, minimal or no absorption at visible wavelengths, and a sufficiently high refractive index (e.g., approximately 2.4). The ALD technique is conformal; and therefore a deposition thickness of at least W/2 (where W is the nanofin width) can be used to produce void-free nanofins. The deposition can leave a $TiO_2$ film on top of the resist, which can be subsequently removed by controlled blanket reactive ion etching. The remaining electron beam resist can be stripped, leaving high aspect-ratio nanofins.

Figure 1G:
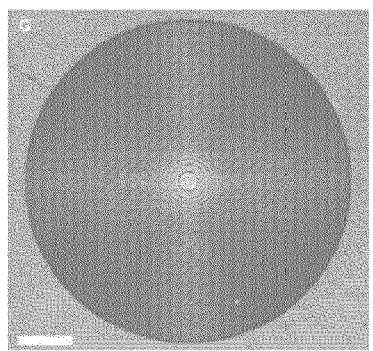
FIG. 1G is an optical image of a meta-lens.
Figure 1H:
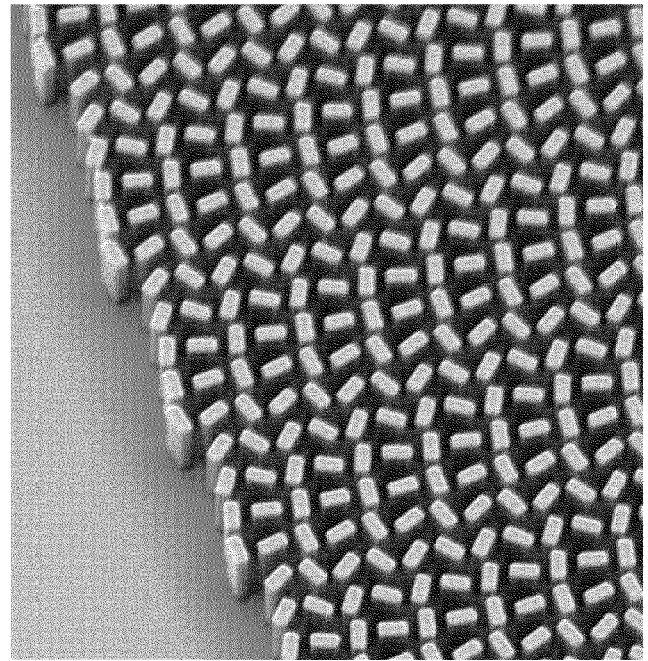
FIG. 1H is a scanning electron micrograph image of a portion of a meta-lens.

FIG. 1G is an optical image of one of the fabricated meta-lenses. FIG. 1H is a scanning electron microscope (SEM) image of the same fabricated meta-lens. FIG. 1I is an SEM image of another of the fabricated meta-lenses from a perspective view at an edge of the meta-lens. FIG. 1J is an SEM image of a high-magnification top view of a portion of the meta-lens of FIG. 1I near an edge of the meta-lens. FIG. 1K is an SEM image of a top view of a portion of the meta-lens near a center of the meta-lens of FIG. 1I.

As discussed above, in some embodiments, the geometrical parameters of the nanofins can be defined by the resist rather than top-down etching. Therefore, high-aspect-ratio nanofins with approximately 90° vertical sidewalls can be obtained. It is notable that achieving these atomically smooth sidewalls is very challenging with a conventional top-down approach (e.g., lithography followed by dry etching) because inevitable lateral etching results in surface roughness and tapered or conical nanostructures.

Fabrication and Characterization of Meta-Lenses Including Nanofins

Figure 2:
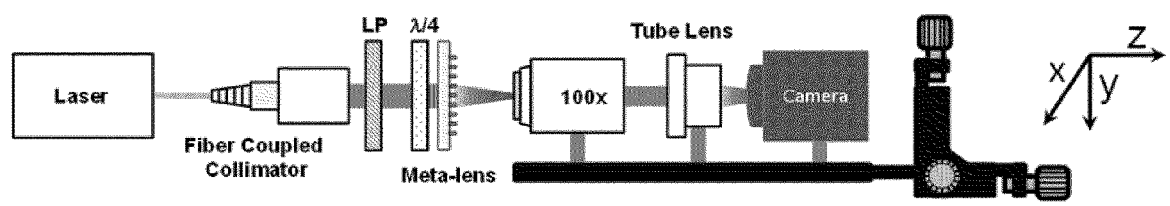
FIG. 2 illustrates an experimental setup used to measure focal spot sizes and conversion efficiencies of the meta-lenses.

FIG. 2 illustrates an experimental setup used to measure focal spot sizes and conversion efficiencies of the meta-lenses. The experimental setup can include, e.g., a laser, a fiber coupled collimator, a long-pass (LP) filter, a quarter waveplate (λ/4), one or more meta-lenses, a magnification device (with, e.g., magnification of 100×), a tube lens and a camera.

In some embodiments, the focal spots of the meta-lenses may be characterized using a custom-built microscope as illustrated in FIG. 2. The sources used in the focal spot characterizations may be one or more lasers with linewidths of, e.g., less than 100 megahertz (MHz). The laser beam may be collimated by a fiber-coupled collimator with a beam size diameter of, e.g., 4 millimeters (mm). The collimated beam may be passed through a Glan-Thompson polarizer and a quarter waveplate to generate circularly polarized light. A magnification device (with, e.g., magnification of 100×, and an NA of 0.9) may be used to magnify the image of light focused by the meta-lens. A tube lens with focal length of, e.g., f=180 mm may be used to form an image recorded on a camera (e.g., a charge-coupled device (CCD) or complementary metal-oxide-semiconductor (CMOS) camera).

Figures 3A, 3B, 3C:
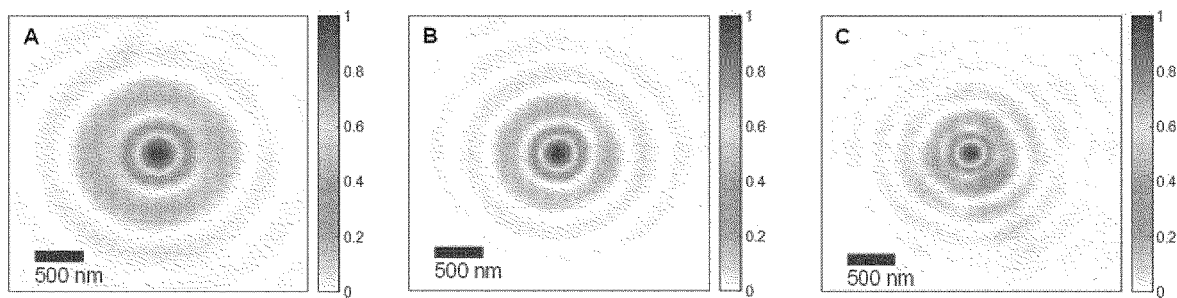
FIG. 3A illustrates a focal spot achieved by a fabricated meta-lens.
FIG. 3B illustrates a focal spot achieved by a fabricated meta-lens.
FIG. 3C illustrates a focal spot achieved by a fabricated meta-lens.

FIG. 3A, FIG. 3B and FIG. 3C illustrate focal spots that are achieved by some of the fabricated meta-lenses and are recorded by the setup of FIG. 2. Accordingly, FIG. 3G, FIG. 3H and FIG. 3I are plots of focal spot intensities for the respective fabricated meta-lenses.

FIG. 3A shows a highly symmetric focal spot that is obtained at 660 nm for the meta-lens with design wavelength $\lambda_d$=660 nm. The vertical cut of the focal spot is also shown in FIG. 3G with a diffraction-limited $$\left(\frac{\lambda}{2 \times NA}\right)$$

full-width at half-maximum (FWHM) of approximately 450 nm. FIG. 3B shows a focal spot for the meta-lens designed at the wavelength of $\lambda_d$=532 nm; and FIG. 3H shows its corresponding vertical cut. This meta-lens design can be extended to the shorter wavelength region of the visible spectrum, which is of great interest in many areas of optics such as lithography and photo-luminescence spectroscopy.

Figures 3D, 3E, 3F:
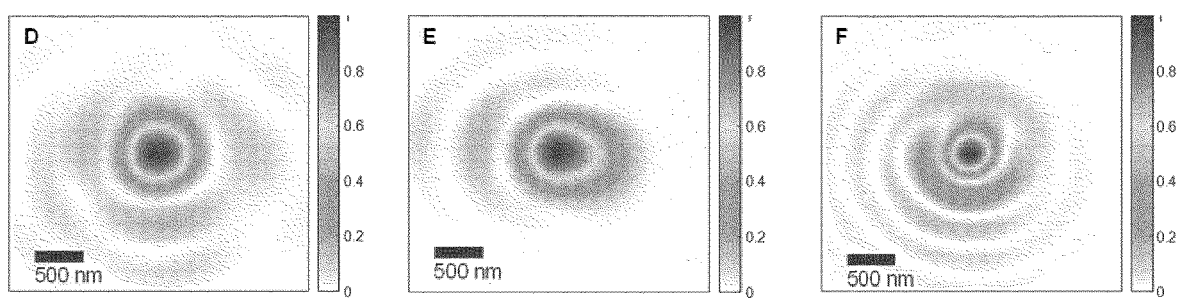
FIG. 3D illustrates a focal spot achieved by a commercially available conventional objective lens.
FIG. 3E illustrates a focal spot achieved by a commercially available conventional objective lens.
FIG. 3F illustrates a focal spot achieved by a commercially available conventional objective lens.
Figures 3G, 3H, 3I, 3J, 3K, 3L:
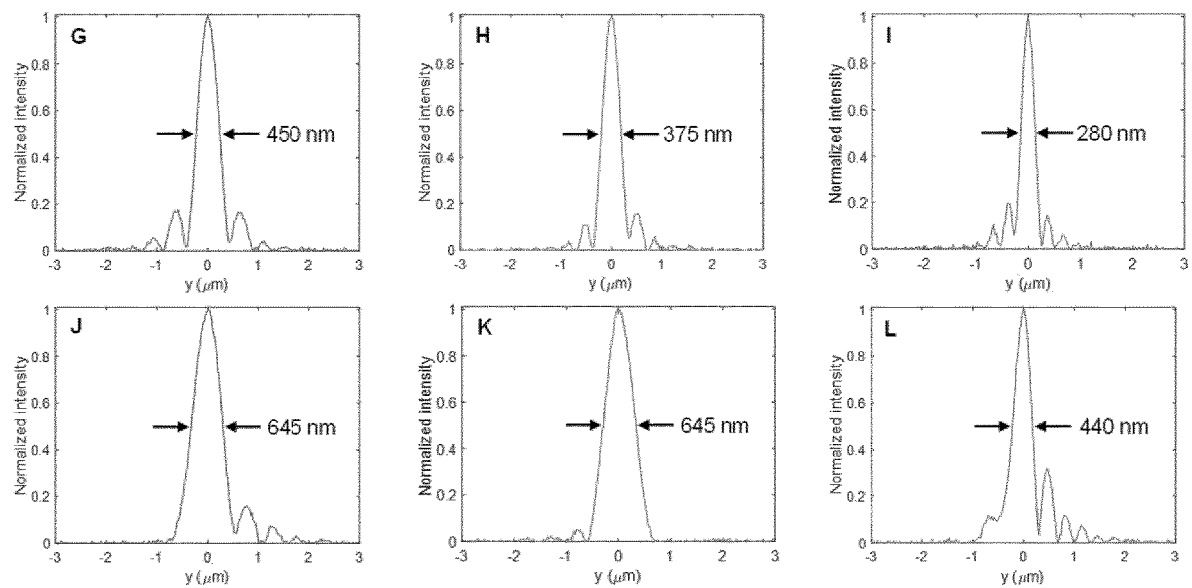
FIG. 3G is a diagram illustrating focal spot intensities for the fabricated meta-lens of FIG. 3A.
FIG. 3H is a diagram illustrating focal spot intensities for the fabricated meta-lens of FIG. 3B.
FIG. 3I is a diagram illustrating focal spot intensities for the fabricated meta-lens of FIG. 3C.
FIG. 3J is a diagram illustrating focal spot intensities for the commercially available conventional objective lens of FIG. 3D.
FIG. 3K is a diagram illustrating focal spot intensities for the commercially available conventional objective lens of FIG. 3E.
FIG. 3L is a diagram illustrating focal spot intensities for the commercially available conventional objective lens of FIG. 3F.

FIG. 3C shows a focal point for the meta-lens designed at the wavelength $\lambda_d$=405 nm; and FIG. 3I shows its corresponding vertical cut with a FWHM of approximately 280 nm. Although this wavelength is very close to the band gap of $TiO_2$, namely about $\lambda_g$=360 nm, the absorption loss is still negligible.

To compare the performance of the meta-lenses with a commercially available conventional objective lens, focal spots of such a conventional objective lens are recorded. The conventional objective lens has the same NA as the meta-lenses of FIGS. 3A-3C (0.8) and is designed for visible light. The conventional object lens is bulkier and more expensive to build than the meta-lenses. Focal spot intensity profiles of the conventional objective lens at wavelengths of 660 nm, 532 nm, and 405 nm are measured using the same setup as illustrated in FIG. 2 and described above. Focal point results for the objective are shown in FIGS. 3D-3F, with corresponding vertical cuts of the focal spots in FIGS. 3J-3L. The comparison between FIGS. 3J-3L for the objective and FIGS. 3G-3I for the meta-lenses reveals that the meta-lenses provide smaller (e.g., approximately 1.5 times) and more symmetric focal spots.

This improvement provided by the meta-lenses is at least partially because conventional high NA objective lenses are designed to image under broadband illumination. That is, the conventional objective lenses are designed to correct wavefront aberrations for multiple wavelengths for a range of angles of incidence to meet industry standards for a specified field of view, such as by cascading a series of precisely aligned compound lenses. However, fabrication imperfections in each individual optical lens and residual aberration errors, particularly spherical aberration, result in a focal spot size larger than theoretical predictions.

In contrast, the meta-lens can be designed to have a phase profile free of spherical aberration for normally incident light, which can result in a diffraction-limited spot at a specific design wavelength. For example, in some embodiments, a root mean square of the wave aberration function ($WAF_{RMS}$) for the meta-lens designed for 405 nm, 532 nm, and 660 nm may be respectively 0.006λ, 0.012λ and 0.017λ. These values are close to the condition for a perfect spherical wavefront. In addition, due to the use of the geometric phase, the phase profile of the meta-lens can be dependent on the rotation of the nanofins, which can be controlled with very high precision, which is characteristic of electron beam lithography. Note that the present disclosure is not limited to electron beam lithography, and other high throughput lithography techniques (such as deep-ultraviolet (UV) lithography) can provide similar fabrication accuracy within the present disclosure.

Note that although each meta-lens can be designed at a specific wavelength, wavelength-scale focal spots can be observed at wavelengths away from the designed wavelength. For example, in some embodiments, for the meta-lens designed at $\lambda_d$=532 nm, focal spot sizes of approximately 745 nm and approximately 600 nm can be measured at incident wavelengths of λ=660 nm and λ=405 nm, respectively. The broadening of the focal spot with respect to the theoretical diffraction-limited values may be due to chromatic aberration, because metasurfaces can be dispersive by nature.

Figures 4A, 4B:
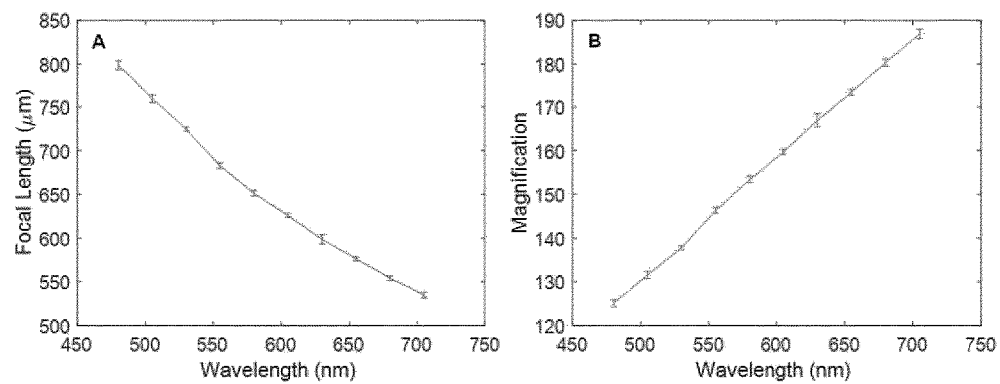
FIG. 4A is a diagram illustrating measured focal length versus wavelength for a meta-lens.
FIG. 4B is a diagram illustrating measured magnification versus wavelength for a meta-lens.

In some embodiments chromatic aberrations in the fabricated meta-lens can be more pronounced than lenses based on conventional refractive optics, resulting in a wavelength-dependent focal length. FIG. 4A illustrates measured focal length of the meta-lens with $\lambda_d$=532 nm (D=approximately 2 mm, f=approximately 0.725 mm), and FIG. 4B illustrates magnification corresponding to the focal lengths of FIG. 4A, shown after taking into consideration the tube lens with a focal length of 100 mm. The wavelength-dependent focal length of the meta-lens is generally not an issue for laser-related imaging, microscopy, and spectroscopy because monochromatic sources with narrow linewidths are used. For example, in Raman microscopes or spectrometers, a 532 nm laser with a linewidth of a few picometers is common. In this case, the linewidth-induced broadening of the focal spot size and change in focal length is negligible in context.

Focusing efficiency of the fabricated meta-lenses are also measured. The source used for efficiency measurements is a supercontinuum laser with a linewidth of, e.g., 10 nm, where efficiency here refers to a ratio of an optical power of the focused beam to an optical power of the incident beam, as captured by a photodetector located at a same position as the camera. Incident optical power is also measured, by the light passing through an aperture (aluminum on glass) with the same size as the meta-lens.

Figures 5A, 5B:
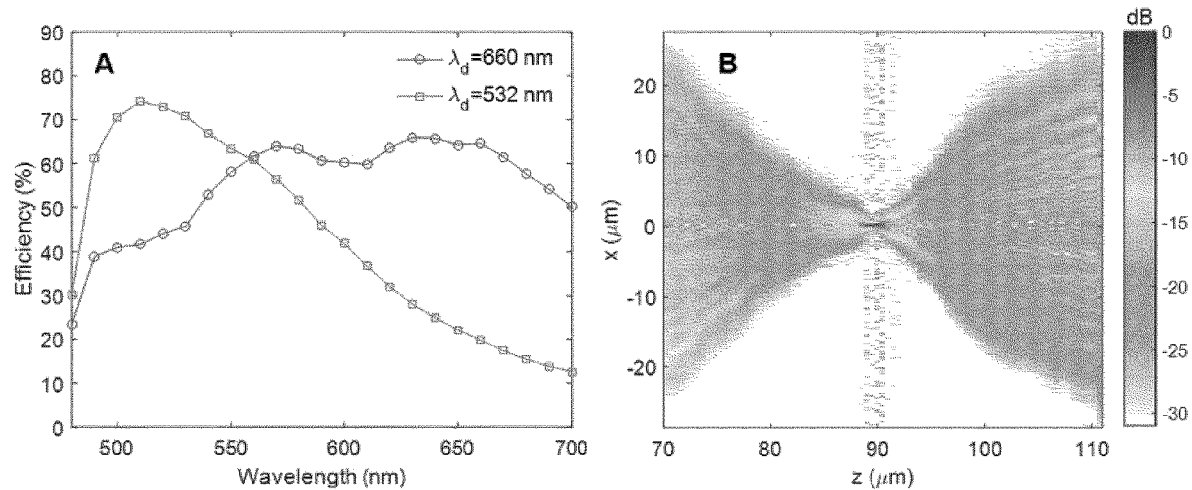
FIG. 5A is a diagram illustrating measured efficiency versus wavelength for two meta-lenses.
FIG. 5B is a diagram illustrating measured beam intensity for a meta-lens.

FIG. 5A illustrates measurement results of focusing efficiency for the meta-lens designed for $\lambda_d$=660 nm, where the focusing efficiency remains above 50% over most of the visible spectrum. FIG. 5A also illustrates measurement results of focusing efficiency for the meta-lens designed for $\lambda_d$=532 nm, where there is a focusing efficiency of 73% at the design wavelength.

FIG. 5B illustrates measurement results of beam intensity for the meta-lens within a 40 µm span around its focal point. The negligible background signal demonstrates not only an excellent phase realization, where the beam converges to a diffraction-limited spot, but also a high conversion efficiency of each nanofin. For the meta-lens designed for $\lambda_d$=405 nm, a measured focusing efficiency of 86% is achieved. The latter measurement can be conducted using, e.g., a diode laser instead, because the shortest wavelength that that tunable laser can provide is approximately 470 nm. All of the efficiency measurements are performed using, e.g., right circularly polarized incident light. However, the polarization sensitivity of the design can be overcome by, e.g., implementing the phase profile using circular cross section nanopillars in which the phase is controlled via changing their diameters.

Figure 6:
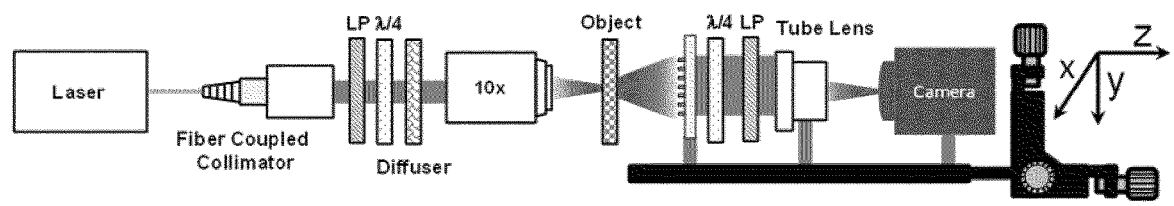
FIG. 6 illustrates an experimental setup used to measure performance of a meta-lens.

To demonstrate the use of the meta-lens in practical imaging, in some embodiments, another meta-lens can be fabricated with $\lambda_d$=532 nm, diameter of approximately D=2 mm and focal length of approximately f=0.725 mm, giving an NA of about 0.8. The imaging resolution can be characterized using, e.g., the 1951 United States Air Force (USAF) resolution test chart as the target object. FIG. 6 illustrates the measurement setup used to measure performance of the meta-lens. The light source can be a tunable laser set at, e.g., 550 nm with a bandwidth of, e.g., 5 nm. Because the resulting image can be larger than a sensing surface of the camera, the image can be projected onto a white screen. Its photo can be taken with, e.g., a digital single-lens reflex (DSLR) camera. The smallest features of the target object are lines with widths of, e.g., 2.2 µm and center-to-center distances of, e.g., 4.4 µm.

Figures 7A, 7B, 7C, 7D, 7E:
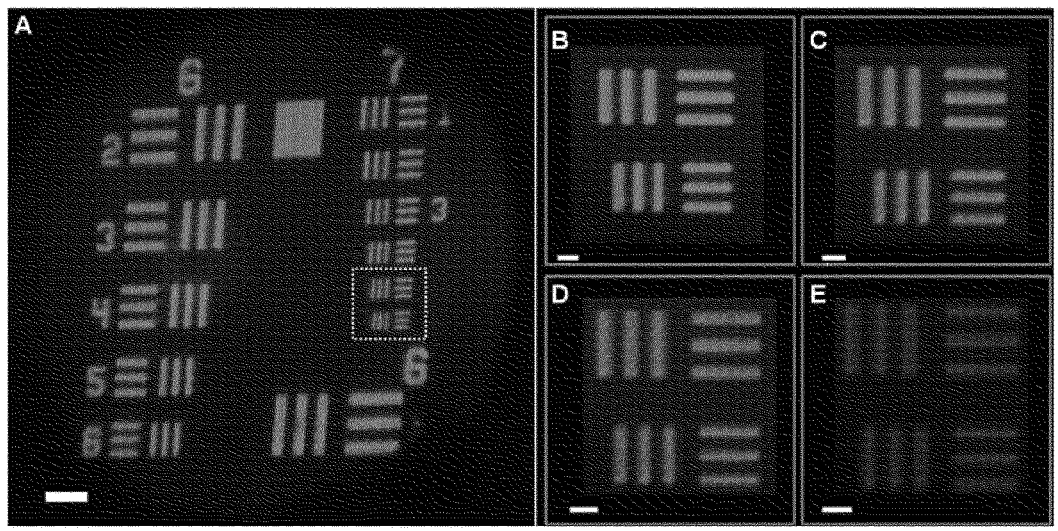
FIG. 7A illustrates a sample image formed by a meta-lens.
FIG. 7B illustrates a sample image formed by a meta-lens.
FIG. 7C illustrates a sample image formed by a meta-lens.
FIG. 7D illustrates a sample image formed by a meta-lens.
FIG. 7E illustrates a sample image formed by a meta-lens.
Figures 7F, 7G, 7H, 7I:
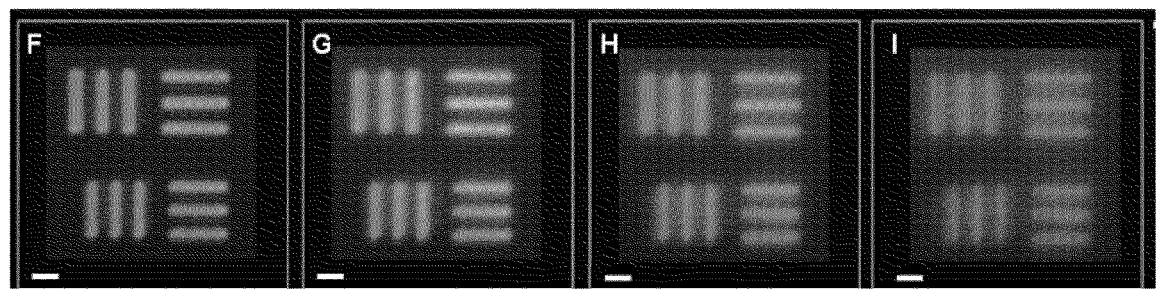
FIG. 7F illustrates a sample image formed by a meta-lens.
FIG. 7G illustrates a sample image formed by a meta-lens.
FIG. 7H illustrates a sample image formed by a meta-lens.
FIG. 7I illustrates a sample image formed by a meta-lens.

FIGS. 7A-7I, 7K and 7M are images formed by the fabricated $\lambda_d$=532 nm (D=2 mm, f=0.725 mm) meta-lens. FIG. 7A shows an image of the target object formed by the meta-lens, where a dotted-line box indicates a set of four smallest target object features, and the smallest two features are the two at the bottom of the dotted-line box. The scale bar in FIG. 7A indicates 30 µm. FIGS. 7B-7E are images of the dotted-line box portion (as illustrated in FIG. 7A) of the target object at source wavelengths of 480 nm (FIG. 7B), 530 nm (FIG. 7C), 590 nm (FIG. 7D) and 620 nm (FIG. 7E). The scale bar in each of FIGS. 7B-7E indicates 5 μm.

FIGS. 7F-7I are images of the dotted-line box portion (as illustrated in FIG. 7A) of the target object. To characterize the effects of chromatic aberration, the target object is imaged at 530 nm without changing a distance between the meta-lens and the target object, while varying the bandwidth of the source: bandwidth of 10 nm (FIG. 7F), 30 nm (FIG. 7G), 50 nm (FIG. 7H) and 100 nm (which can be the limit of the tunable laser, FIG. 7I). Although the quality of the image may slightly degrade from increasing the bandwidth, the smallest features can still be resolvable even at the maximum bandwidth of the laser at, e.g., 100 nm.

Figures 7J, 7K, 7L, 7M:
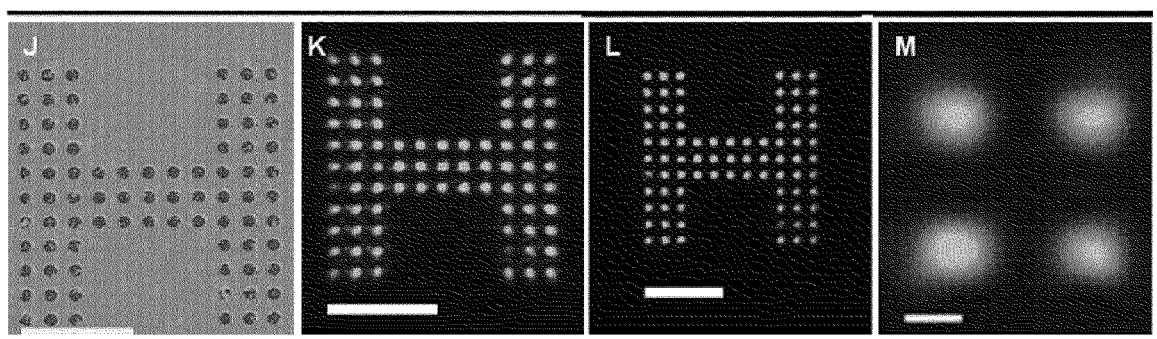
FIG. 7J illustrates a sample of a target object.
FIG. 7K illustrates a sample image of the target object of FIG. 7J formed by a meta-lens.
FIG. 7L illustrates an image of the target object of FIG. 7J taken by a commercially available conventional objective lens.
FIG. 7M illustrates a sample image formed by a meta-lens.

FIG. 7J shows an SEM micrograph of a nanoscale H-shaped target prepared by focused ion beam, where a gap between neighboring holes is approximately 800 nm. The target is used to compare imaging quality of the meta-lens to that of a commercially available conventional objective lens. FIG. 7K is an image of the target object of FIG. 7J formed by the meta-lens. FIG. 7L is an image of target object of FIG. 7J formed by a commercially available conventional objective lens. The image formed by the meta-lens (as illustrated in FIG. 7K) has comparable or superior quality to the one formed by the commercially available conventional objective lens (as illustrated in FIG. 7L) with the same NA=0.8. The change in the image sizes can be due to the difference in the magnification of the imaging systems. The scale bar in each of FIGS. 7J-7L indicates 10 μm.

FIG. 7M is an image formed by the meta-lens, showing that holes with sub-wavelength gaps of 480 nm can be resolved. The scale bar in FIG. 7M indicates 500 nm.

As can be seen from FIGS. 7A-7I, 7K and 7M, the fabricated $\lambda_d$=532 nm (D=2 mm, f=0.725 mm) meta-lens can resolve micrometer-sized lines well. In some embodiments, the focal length of the meta-lens may vary as the wavelength changes, resulting in different levels of magnification (as illustrated in, e.g., FIG. 4B). In the experimental setup, the meta-lens can be used together with a tube lens (having, e.g., f=100 mm) giving a magnification of, e.g., 138×(100/0.725) at, e.g., 530 nm. In some embodiments, for incident wavelengths of 480 nm, 590 nm, and 620 nm, magnifications of 124×, 152×, and 167× can be obtained, respectively, as comparing the ratio of the image sizes formed on the camera to the known physical size of the USAF test object.

The meta-lenses described in some embodiments of the present disclosure can include nanofins with rectangular cross-section, where the nanofins can be rotated to achieve different target phases. The nanofins can be polarization sensitive. In some embodiments, polarization sensitivity of such nanofins can be overcome by implementing the phase profile using, e.g., circular cross-section nanopillars, in which the phase is controlled by nanopillar diameter.

Structures of Meta-Lenses Including Nanopillars

Figure 8A:
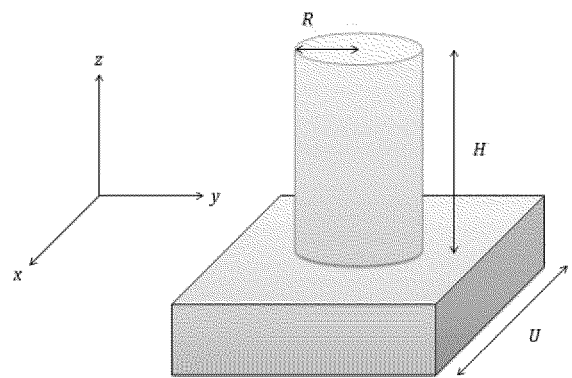
FIG. 8A illustrates a perspective view of an example of a nanopillar.
Figure 8B:
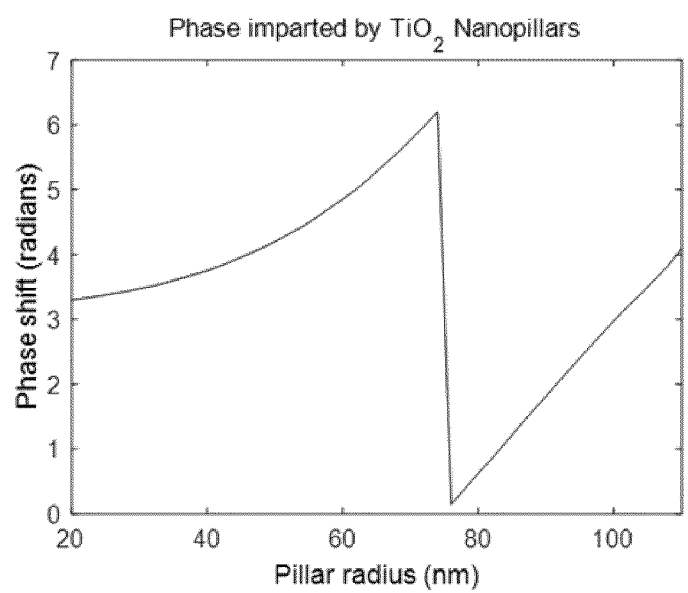
FIG. 8B illustrates phase shifts versus nanopillar radius.
Figure 8C:
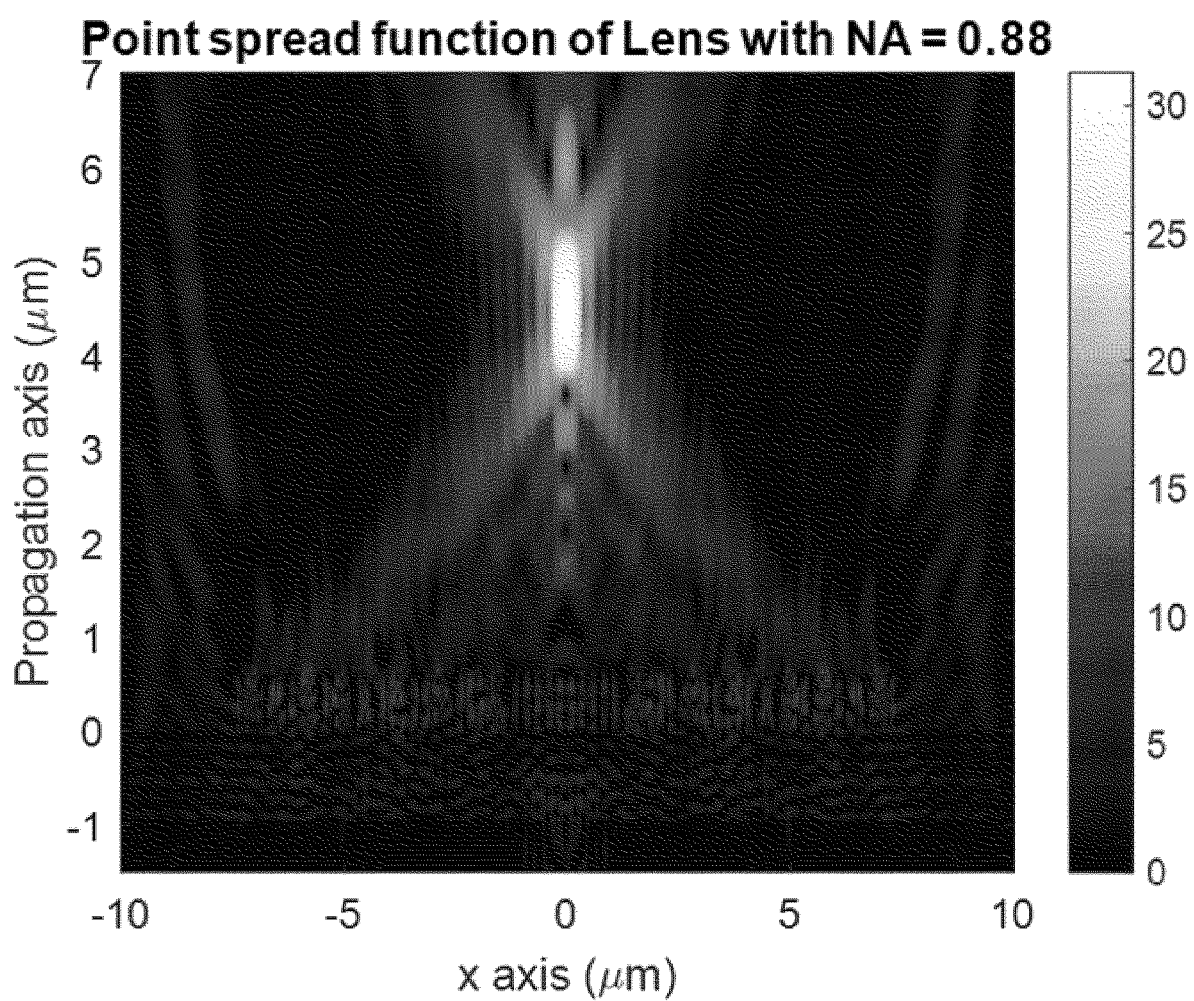
FIG. 8C illustrates a result of simulation of a polarization insensitive nanopillar-based lens.

FIG. 8A diagrammatically illustrates an example of a nanopillar according to some embodiments of the present disclosure. The nanopillar has a height H in the z-direction and a cross-sectional radius R in the x-y plane. The nanopillar occupies a unit space area with dimensions U×U FIG. 8B illustrates that a change in the radius of the nanopillar affects the phase shift characteristics of the nanopillar. FIG. 8C is a simulation result showing that a meta-lens including nanopillars formed of TiO$_2$ with NA=0.88 are insensitive to polarization.

Figure 9A:
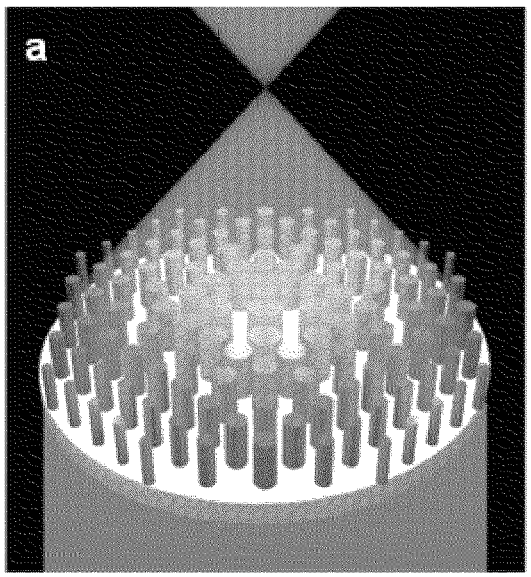
FIG. 9A illustrates a meta-lens including nanopillars.

FIG. 9A illustrates a meta-lens including nanopillars, according to some embodiments of the present disclosure. As illustrated in FIG. 9A, TiO$_2$ nanopillars are fabricated on a front surface of a substrate (e.g., a glass substrate), such as, e.g., using an electron beam lithography technique. In transmission mode, the meta-lens may focus collimated light that is incident on a back surface of the substrate into a spot, as illustrated in FIG. 9A. To accomplish the focusing, a nanopillar at position (x, y) imparts a phase given by equation (5), where $\lambda_d$ is a design wavelength for the meta-lens (e.g., the meta-lens is optimized for incident light having a wavelength $\lambda_d$) and f is a design focal length of the meta-lens. It is to be understood that the term "design" (e.g., as used in "design wavelength," "design focal length" or other phrases below) refers to parameters set during a design phase; which parameters after fabrication may have an associated tolerance.

$$\varphi_t(x, y) = 2\pi - \frac{2\pi}{\lambda_d}\left(\sqrt{x^2 + y^2 + f^2} - f\right) \quad (5)$$

In some embodiments, the phase profile $\varphi_t(x, y)$ for each nanopillar may be realized by adjusting a diameter of the nanopillar. Equation (1) may represent an infinity-corrected phase profile to which a meta-lens may be designed, included by way of example. It is to be understood that other phase profiles may be used as a basis for the meta-lens design instead.

Figure 9B:
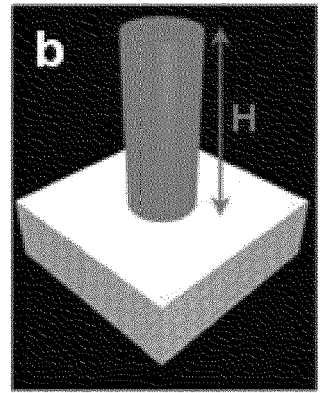
FIG. 9B illustrates a perspective view of a nanopillar.
Figure 9C:
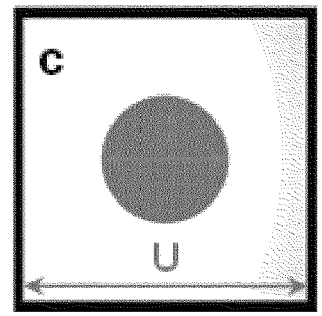
FIG. 9C illustrates a top view of a nanopillar.

To achieve high efficiency, other parameters such as nanopillar height H (as illustrated in FIG. 9B) and unit cell size U (as illustrated in FIG. 9C) can be optimized at the design wavelength $\lambda_d$. In the example as shown in FIG. 9C, a unit cell can be, e.g., approximately a square and the unit cell size can be a wall length of the square. In some other embodiments, the unit cell may be of a different shape, and the unit cell size may be defined accordingly. Further, although the nanopillars are illustrated as being cylindrical, in other embodiments, the nanopillars may have other shapes.

In addition to TiO$_2$, other suitable dielectric materials include those having a light transmittance over the visible spectrum of at least about 40%, at least about 50%, at least about 60%, at least about 70%, at least about 80%, at least about 85%, at least about 90%, or at least about 95%. For example, other suitable dielectric materials can be selected from oxides, nitrides, sulfides and pure elements. Aspect ratios of nanopillars (e.g., a ratio of height to diameter of a nanopillar) can be greater than one, at least about 1.5:1, at least about 2:1, at least about 3:1, at least about 4:1, at least about 5:1, at least about 6:1, or at least about 10:1.

Based on the nanopillars as illustrated in FIGS. 9A-9C, a phase accumulation may be realized by a waveguiding effect. Thus, the height H of the nanopillars may be designed to provide at least a 2π phase coverage through a range of diameters determined for the design of the nanopillars. A smallest diameter may be determined primarily by attainability due to fabrication constraints; and a largest diameter can be equal to the unit cell size U The unit cell size U may be designed to meet the Nyquist sampling riterion $$\left(U < \frac{\lambda}{2NA}\right)$$

for a high efficiency. It is to be understood, however, that in some other embodiments, the unit cell size U may be designed such that it does not meet the Nyqust criterion $$\left(\text{e.g., } U \geq \frac{\lambda}{2NA}\right).$$

In some embodiments, for a design wavelength $\lambda_d=405$ nm, a design unit cell dimension is U=180 nm, a design nanopillar height is H=400 nm and the design nanopillar diameters D may vary between 80 nm to 155 nm. In some embodiments, for a design wavelength $\lambda_d=532$ nm, a design unit cell dimension is U=250 nm, a design nanopillar height is H=600 nm and the design nanopillar diameters D may vary between 100 nm to 220 nm. In some embodiments, a design wavelength $\lambda_d=660$ nm, a design unit cell dimension is U=350 nm, a design nanopillar height is H=600 nm and the design nanopillar diameters D may vary between 100 nm to 320 nm. In some embodiments, a first nanopillar can have a first diameter, and a second nanopillar can have a second diameter, where the second diameter is at least about 1.1 times greater than the first diameter, such as at least about 1.2 times greater, at least about 1.3 times greater, at least about 1.4 times greater, or at least about 1.5 times greater.

Figure 9D:
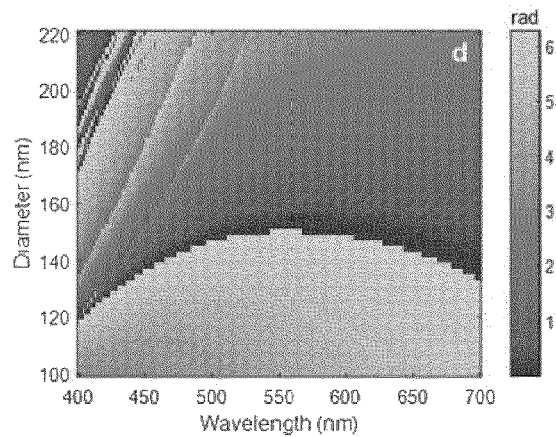
FIG. 9D illustrates a phase map $\varphi(D)$ (left) and a transmission map $T(D)$ (right) of nanopillars, as functions of diameter across the visible spectrum.
Figure 9D:
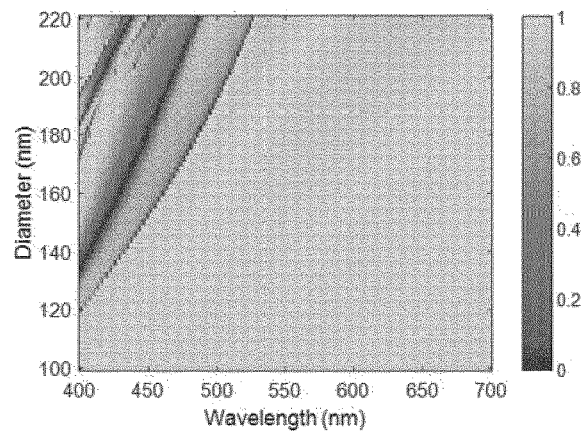

FIG. 9D shows a phase map $\varphi(D)$ (left) and a transmission map T(D) (right), respectively, as functions of diameter across the visible spectrum, for a meta-lens designed for incident light at a design wavelength $\lambda_d=532$ nm with nanopillars having a design height H=600 nm and a design unit cell size U=250 nm. As illustrated in FIG. 9D, each point on the phase map shows a relative phase difference between a nanopillar with diameter D and a reference point where there is no nanopillar (propagation through the air).

As a comparison, the phase imparted solely by the waveguiding effect can be calculated according to equation (6), where $n_{eff}$ is an effective index of the fundamental mode ($HE_{11}$) and H (nanopillar height) is the propagation length. The $n_{eff}$ can be determined using, e.g., a single step-index circular waveguide model.

$$\varphi_{WG} = \frac{2\pi}{\lambda_d} n_{eff} H \tag{6}$$

Figure 9E:
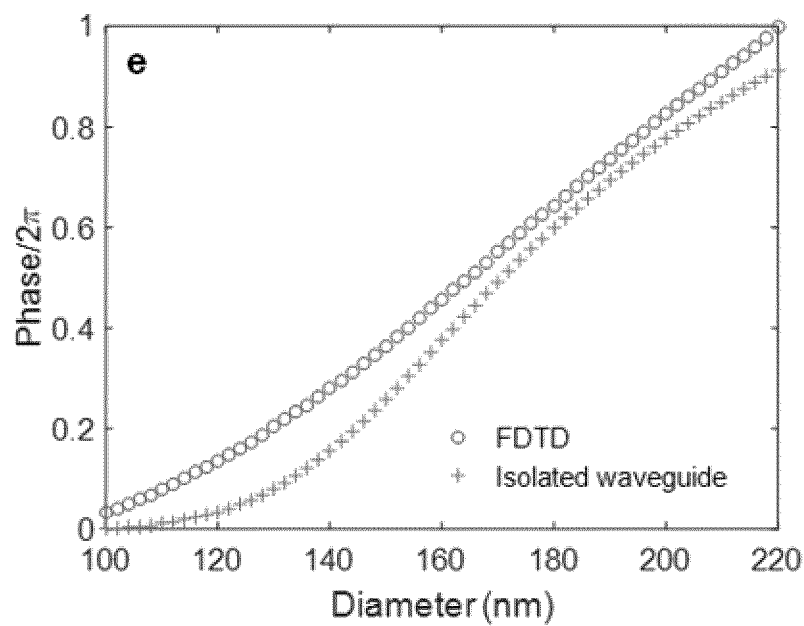
FIG. 9E illustrates a comparison of phase calculated by finite difference time domain (FDTD) simulation of a nanopillar on a glass substrate as a function of diameter D, and the phase due to propagation in an isolated cylindrical waveguide.

FIG. 9E shows that phase determined according to equation (6) (phase due to propagation in an isolated cylindrical waveguide, considering its fundamental mode $HE_{11}$ at $\lambda_d=532$ nm) is similar to phase calculated via FDTD analysis of the nanopillar on the glass substrate (with design wavelength $\lambda_d=532$ nm, and nanopillars having a design height H=600 nm and a design unit cell size U=250 nm). As shown in FIG. 9E, even better agreement in phases can be achieved for larger diameters, where the confinement of the fundamental mode increases. While the confinement along the propagation direction (standing wave due to reflections at both facets of the nanopillars) and near-field coupling between nanopillars can be neglected, an average absolute difference between phases calculated using the waveguiding effect and the full-wave analysis can be less than $$\frac{\pi}{6}.$$

This may indicate that the waveguiding effect may be the dominant mechanism accounting for the phase realization. In some embodiments, full phase coverage ($2\pi$) with high transmission (of, e.g., greater than about 87%) can be achieved.

In some embodiments, by varying diameters of nanopillars as a function of position ($x_i$, $y_i$), the effective index of the propagating mode can be changed to achieve the desired phase profile of equation (5). To construct a corresponding meta-lens, the phase mask $\varphi_t(x_i, y_i)$ may be discretized, assuming square lattice unit cells of dimensions U×U. At is each position ($x_i,y_i$) an appropriate diameter minimizing $|T_m e^{i\varphi_t(x_i,y_i)} - T(D)e^{i\varphi(D)}|$ is selected, where $T_m$ is the transmission averaged over all the diameters.

Figure 9F:
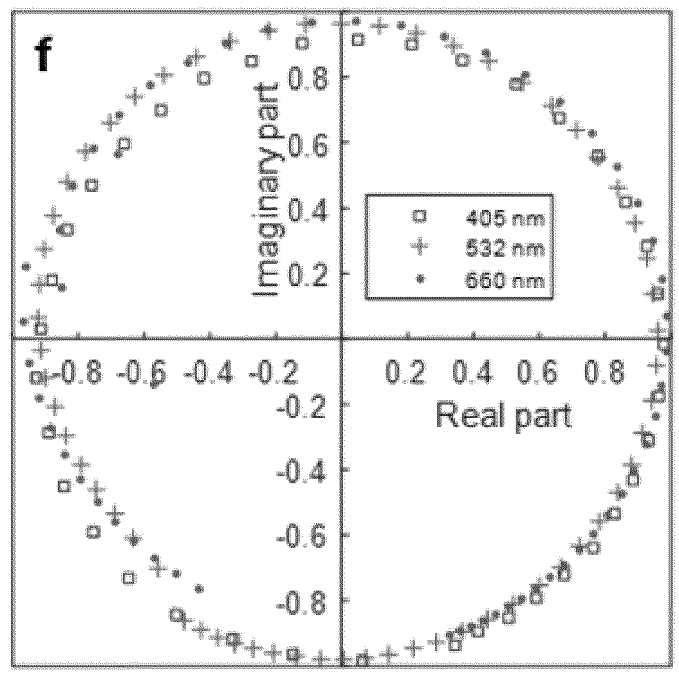
FIG. 9F illustrates complex transmission coefficients $(T(D)e^{i\varphi(D)})$ of nanopillars at three design wavelengths for a range of diameters to provide $2\pi$ phase coverage.

FIG. 9F shows the complex transmission coefficients ($T(D)e^{i\varphi(D)}$) at three design wavelengths for a range of diameters to provide $2\pi$ phase coverage. Each point in the complex plane represents an amplitude and phase of transmission of a nanopillar with diameter D, for a given unit cell size and nanopillar height at the corresponding design wavelength. High transmission (with small modulation over the range of used diameters) and close to $2\pi$ phase coverage is evident for all three design wavelengths.

Fabrication and Characterization of Meta-Lenses Including Nanopillars

Figure 10A:
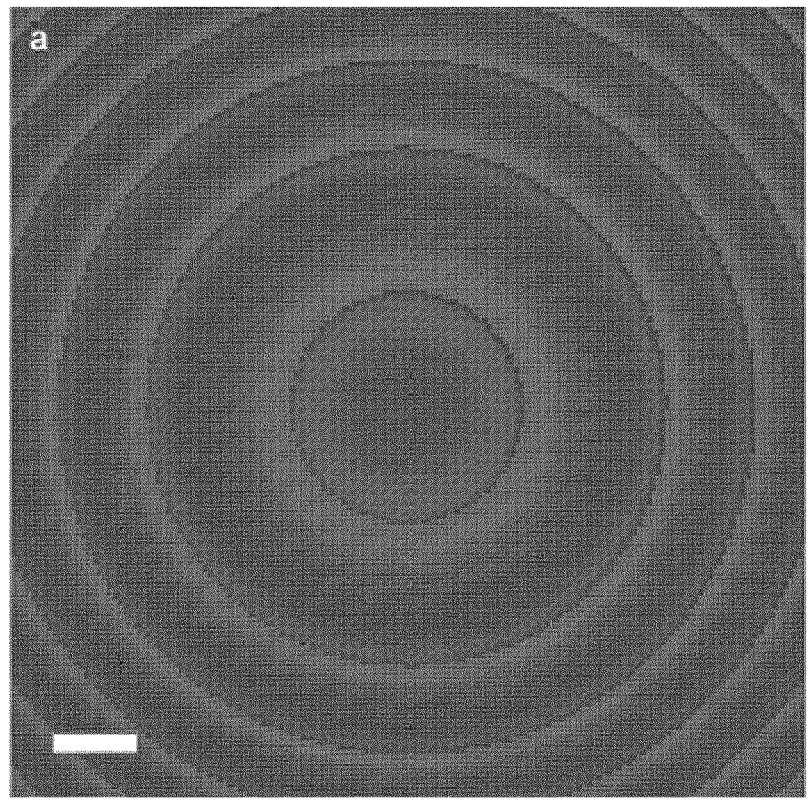
FIG. 10A illustrates a scanning electron microscope images of a fabricated meta-lens.
Figure 10B:
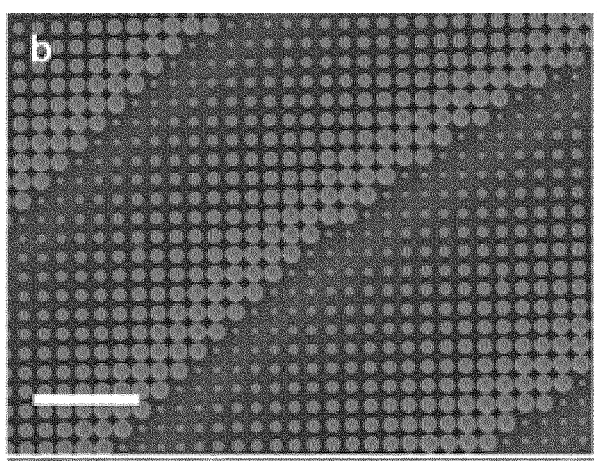
FIG. 10B illustrates a scanning electron microscope images of a fabricated meta-lens.
Figure 10C:
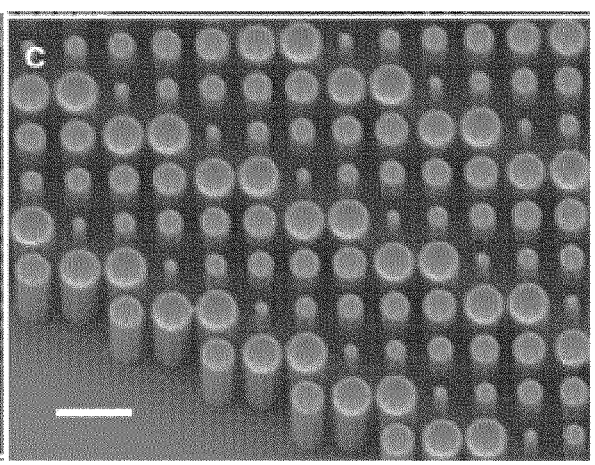
FIG. 10C illustrates a scanning electron microscope images of a fabricated meta-lens.
Figures 10D, 10E, 10F:
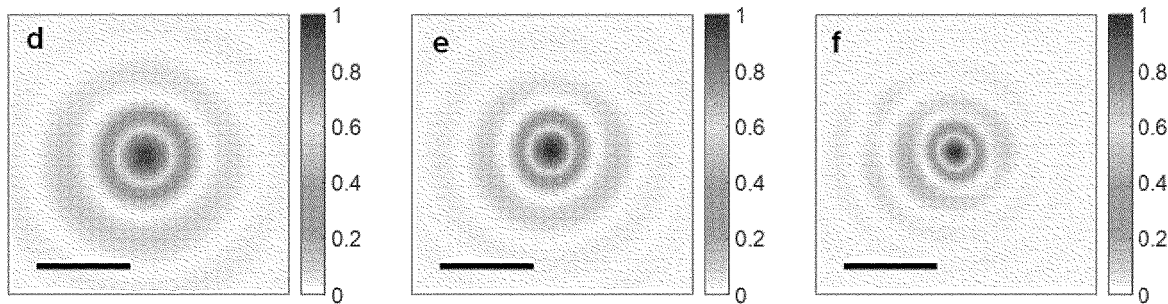
FIG. 10D illustrates a measured focal spot of a meta-lens.
FIG. 10E illustrates a measured focal spot of a meta-lens.
FIG. 10F illustrates a measured focal spot of a meta-lens.
Figures 10G, 10H, 10I:
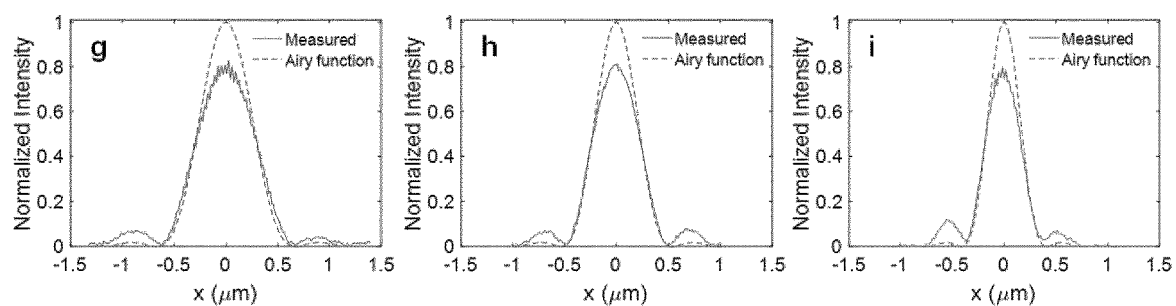
FIG. 10G illustrates horizontal cuts according to the focal spot illustrated in FIG. 10D.
FIG. 10H illustrates horizontal cuts according to the focal spot illustrated in FIG. 10E.
FIG. 10I illustrates horizontal cuts according to the focal spot illustrated in FIG. 10F.
Figure 10J:
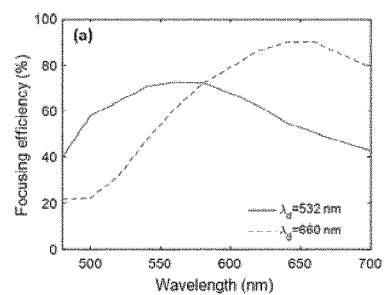
FIG. 10J illustrates focusing efficiencies for two fabricated meta-lenses.
Figure 10K:
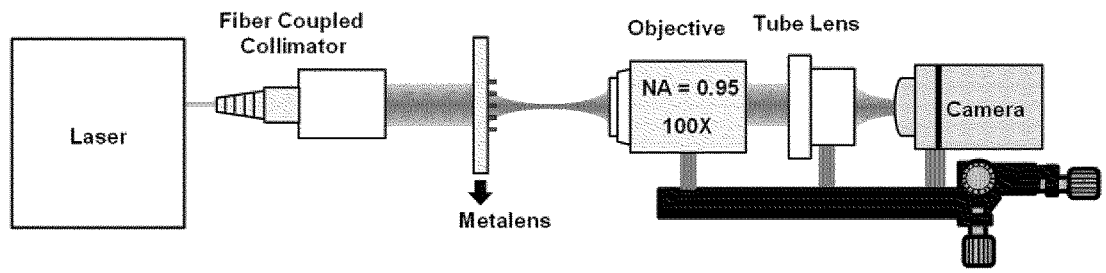
FIG. 10K illustrates an experimental setup used to measure performance of meta-lenses.
Figure 10L:
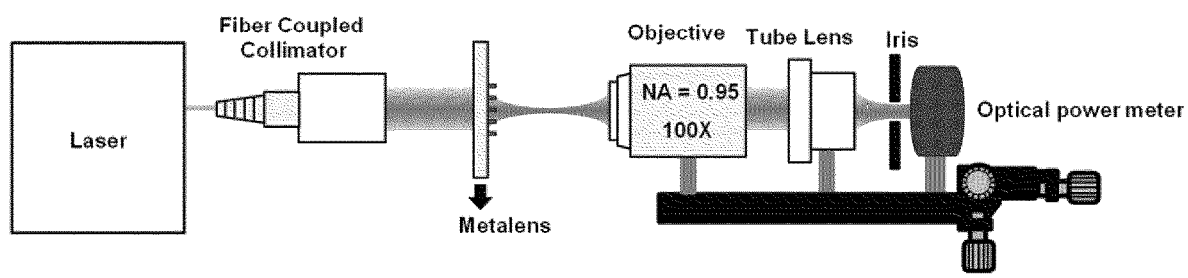
FIG. 10L illustrates an experimental setup used to measure performance of meta-lenses.

In some embodiments, three separate meta-lenses can be fabricated, each with a design NA of about 0.6, and are optimized for design wavelengths of about 405 nm, about 532 nm and about 660 nm. FIGS. 10A-10C are scanning electron microscope (SEM) images of one of the fabricated meta-lenses. FIGS. 10D-10F illustrate measured focal spots of the fabricated meta-lenses. FIGS. 10G-10I are horizontal cuts corresponding respectively to the focal spots illustrated in FIGS. 10D-10F. FIG. 10J illustrates focusing efficiencies for two of the fabricated meta-lenses. FIGS. 10K and 10L illustrate experimental setups used to characterize the three fabricated meta-lenses.

In some embodiments, to calculate the Strehl ratio, the measured intensities of the horizontal cuts may be normalized to those of ideal airy functions with a same area under the curve. Airy functions with a maximum intensity of unity and diffraction-limited full-width at half-maximum $$(FWHM) \text{ of } FWHM = 0.514 \frac{\lambda_d}{NA}$$

are plotted over the horizontal cuts illustrated in FIGS. 10G-10I. In some embodiments, Strehl ratios of about 0.80, about 0.82 and about 0.83 may be achieved at wavelengths of about 405 nm, about 532 nm and about 660 nm, respectively. Corresponding Strehl ratios for vertical cuts (not shown here) may be about 0.81, about 0.84 and about 0.81, which are close to those for horizontal cuts, revealing symmetry of the focal spots.

FIG. 10J illustrates measured focusing efficiencies for the meta-lenses of design wavelengths of 532 nm and 660 nm. Measured focusing efficiencies as high as about 70% and about 90% can be obtained for meta-lenses designed at wavelengths 532 nm and 660 nm, respectively. In some embodiments, measured focusing efficiencies as high as about 30% are obtained for meta-lenses designed at a wavelength of 405 nm (not shown in FIG. 10J). Focusing efficiency can be defined as a ratio of optical power of the measured focused beam to optical power of the incident beam. The incident beam may be measured as the optical power passing through a circular aperture (e.g., aluminum on glass) with a same diameter (300 µm) as the meta-lenses.

Figures 11A, 11B, 11C:
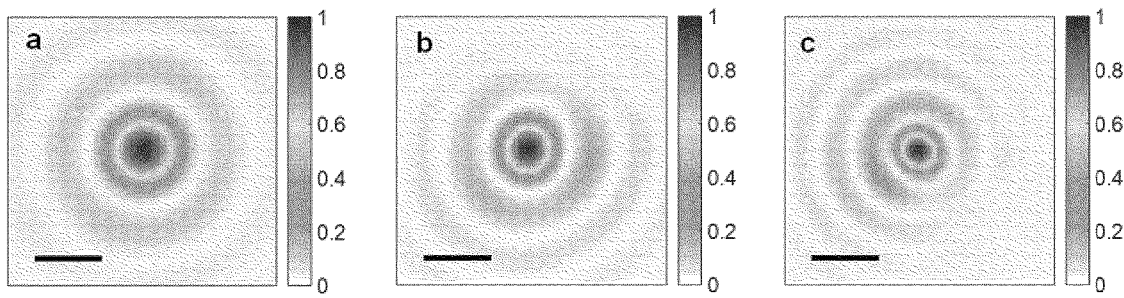
FIG. 11A illustrates a measured focal spot of a meta-lens.
FIG. 11B illustrates a measured focal spot of a meta-lens.
FIG. 11C illustrates a measured focal spot of a meta-lens.
Figures 11D, 11E, 11F:
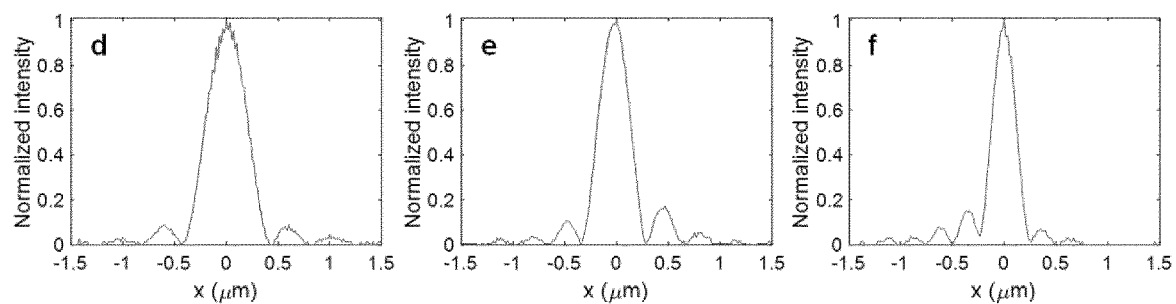
FIG. 11D illustrates horizontal cuts corresponding to the focal spot illustrated in FIG. 11A.
FIG. 11E illustrates horizontal cuts corresponding to the focal spot illustrated in FIG. 11B.
FIG. 11F illustrates horizontal cuts corresponding to the focal spot illustrated in FIG. 11C.

In some embodiments, three separate meta-lenses may be fabricated, each with a design NA of about 0.85, optimized for design wavelengths of about 405 nm, about 532 nm and about 660 nm. FIGS. 11A-11C illustrate measured focal spots of the meta-lenses. FIGS. 11D-11F illustrate horizontal cuts corresponding respectively to the focal spots illustrated in FIGS. 11A-11C. FIG. 3G illustrates focusing efficiencies for two of the fabricated meta-lenses.

As shown in FIGS. 11A-11C, symmetric focal spots with diffraction-limited FWHMs can be achieved. As shown in FIGS. 11D-11F, FWHMs of the horizontal cuts of these focal spots may be about 259 nm, about 327 nm, and about 424 nm for meta-lenses at respective design wavelengths of about 405 nm, about 532 nm and about 660 nm. The FWHMs of the vertical cuts of these focal spots may be about 256 nm, about 344 nm and about 428 nm for the meta-lenses at respective design wavelengths of about 405 nm, about 532 nm and about 660 nm. The Strehl ratios from the measured horizontal cuts may be about 0.76, about 0.82 and about 0.85 corresponding to meta-lenses designed at respective wavelengths of 405 nm, 532 nm and 660 nm. The Strehl ratios from the measured vertical cuts may be about 0.78, about 0.84 and about 0.85 corresponding to the meta-lenses designed at respective wavelengths of 405 nm, 532 nm and 660 nm. The diffraction-limited focusing and high Strehl ratios confirm the quality of fabrication and capability of this $TiO_2$-based (other based on other suitable materials) platform to realize high performance optics in the visible spectrum.

Figure 11G:
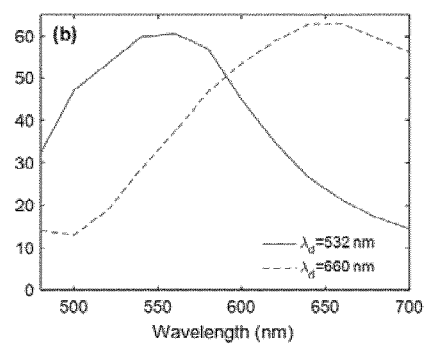
FIG. 11G illustrates focusing efficiencies for two fabricated meta-lenses.
Figure 13A:
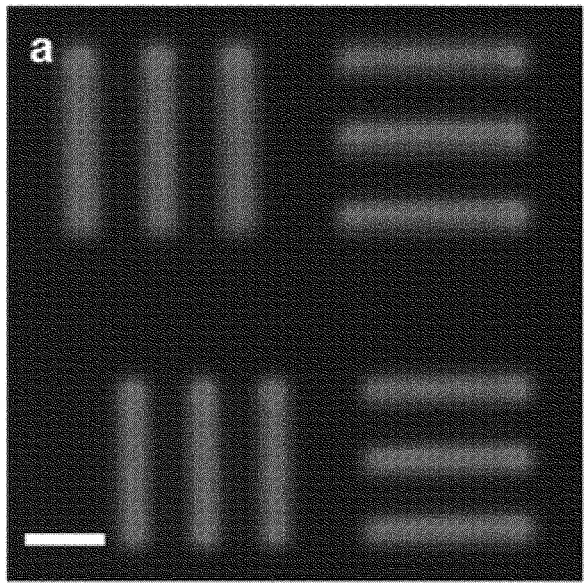
FIG. 13A illustrates an image formed by a meta-lens.
Figure 13B:
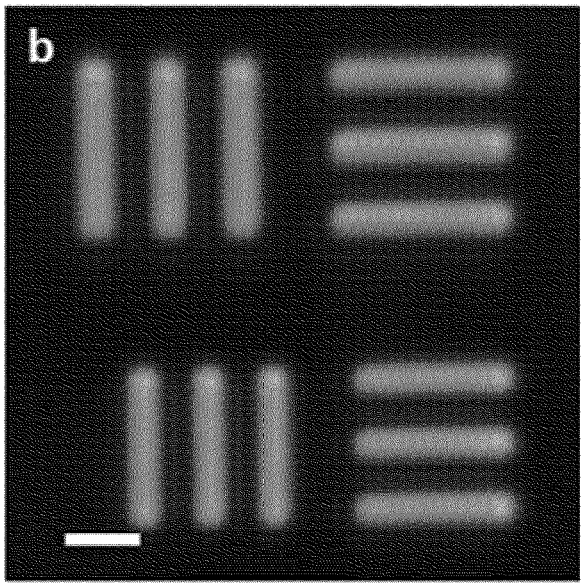
FIG. 13B illustrates an image formed by a meta-lens.
Figure 13C:
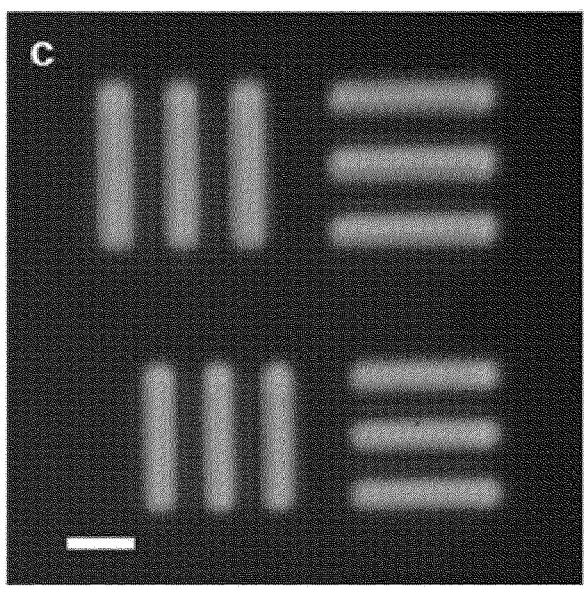
FIG. 13C illustrates an image formed by a meta-lens.
Figure 13D:
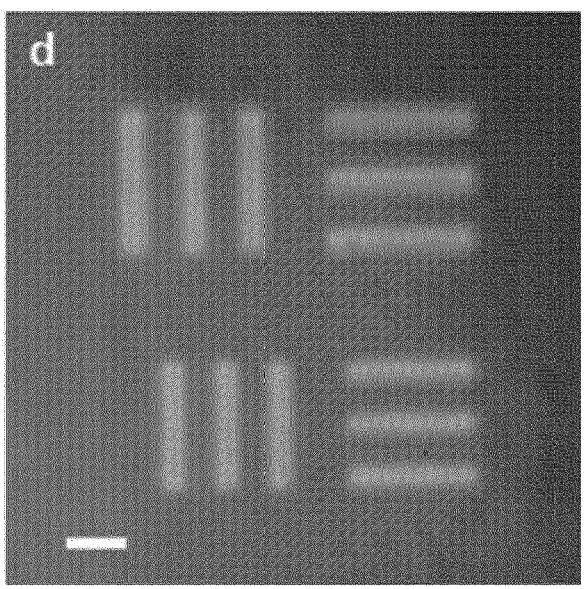
FIG. 13D illustrates an image formed by a meta-lens.

FIG. 11G illustrates efficiency of two of the meta-lenses with NA of about 0.85. In some embodiments, efficiencies as high as about 60% may be achieved for both meta-lenses with design wavelengths of about 532 and about 660 nm. In some embodiments, efficiency as high as about 33% may be achieved for the meta-lens designed at about 405 nm. This can be due to the stricter fabrication tolerance of this design. In other words, nanopillars designed for shorter wavelengths may have $2\pi$ phase coverage over a smaller range of diameters and smaller unit cells. In some embodiments, fabrication errors may be more pronounced, resulting in reduced efficiency. For example, a mean value of the nanopillar diameters used to build the meta-lens designed at 405 nm may be 120 nm, whereas a mean value of the nanopillar diameters used to build the meta-lens designed at 660 nm may be 215 nm.

FIGS. 12A-12C illustrate phase profiles of meta-lenses of NA of about 0.85 at the three design wavelengths ($\lambda_d$=660 nm, 532 nm and 405 nm). The discretized FDTD simulated phases that are theoretically available with suitable nanopillar diameters are overlaid on FIGS. 12A-12C. Good curve fits may be obtained for all three designs. This can be further confirmed by performing FDTD analysis on meta-lenses with similar NA of about 0.85 but smaller lens diameters (e.g., about 24 µm) than the fabricated ones due to finite computational resources.

FIGS. 12D-12F illustrate simulated intensity distributions of respectively the meta-lenses illustrated in FIGS. 12A-12C in the focal region at the x-z plane. In some embodiments, efficiency may be a ratio of the optical power in the focal spot area (circle of radius 2×FWHM spanning the center of the focal spot) to the incident optical power. In some embodiments, efficiencies as high as about 79%, about 83% and about 84% may be achieved for meta-lenses designed at wavelengths of about 405 nm, about 532 nm and about 660 nm, respectively.

In some embodiment, a meta-lens may be fabricated for imaging purposes, with a diameter of about 2 mm designed at about $\lambda_d$=532 nm. The 1951 United States Air Force (USAF) resolution test chart may be used to discern a resolving power of the meta-lens. FIGS. 13A-13D illustrate images of the smallest three-bar groups on the chart (bar width of about 2.2 µm and center-to-center distance of about 4.4 µm), formed by the meta-lens at different illumination wavelengths. As shown in FIGS. 13A-13D, the meta-lens can resolve micron-sized features across the visible spectrum. Differences in image size at various wavelengths may be due to the focal length of the meta-lens being a function of wavelength, resulting in a wavelength-dependent magnification. For example, magnification can change from about 260× to about 337× by varying a wavelength of incidence from about 490 nm to about 650 nm.

Configurations of Optical Systems Incorporating One or More Meta-Lenses

FIGS. 14A-14I illustrate various examples of portions of optical systems incorporating one or more meta-lenses according to various embodiments of the present disclosure.

Figure 14A:
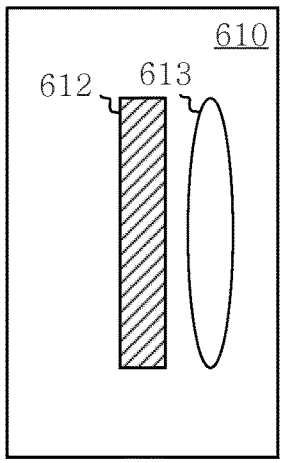
FIG. 14A illustrates an example of an optical system including one or more meta-lenses.

As illustrated in FIG. 14A, an optical system 610 may include a meta-lens 612 and a lens 613. The meta-lens 612 may be designed to provide one or more functionalities such as described in the present disclosure. The meta-lens 612 may be at a distance from the lens 613, or may be positioned against the lens 613 to contact the lens 613. Also in this embodiment, the meta-lens 612 and the lens 623 may have similar dimensions (e.g., diameter).

Figure 14B:
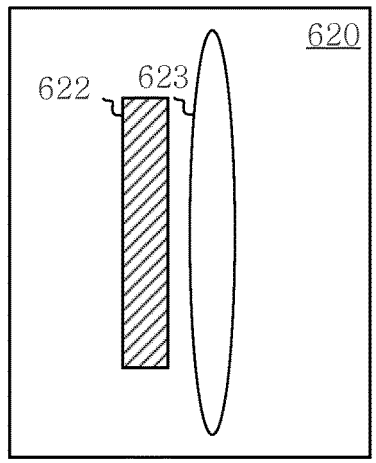
FIG. 14B illustrates an example of an optical system including one or more meta-lenses.

As illustrated in FIG. 14B, an optical system 620 may include a meta-lens 622 and a lens 623. The meta-lens 622 may be designed to provide one or more functionalities such as described in the present disclosure. The meta-lens 622 may be at a distance from the lens 623, or may be positioned against the lens 623 to contact the lens 623. Also in this embodiment, the meta-lens 622 may have a different (lesser or higher) dimension (e.g., diameter) than the lens 623.

Figure 14C:
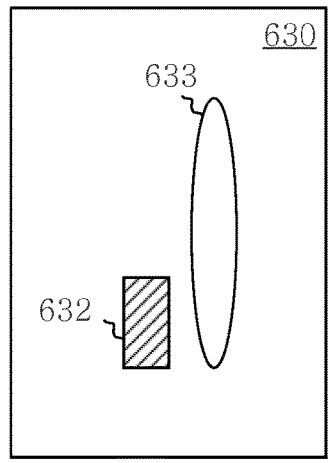
FIG. 14C illustrates an example of an optical system including one or more meta-lenses.

As illustrated in FIG. 14C, an optical system 630 may include a meta-lens 632 and a lens 633. The meta-lens 632 may be designed to provide one or more functionalities such as described in the present disclosure. The meta-lens 632 may be at a distance from the lens 633, or may be positioned against the lens 633 to contact the lens 633. Also in this embodiment, the meta-lens 632 may have a much smaller dimension (e.g., diameter) than the lens 633, such as to correct functionality of a portion of the lens 633.

Figure 14D:
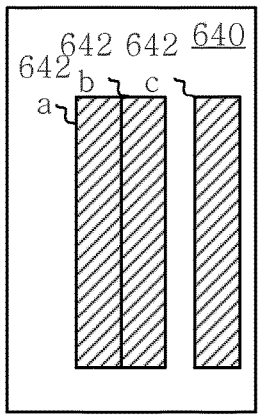
FIG. 14D illustrates an example of an optical system including one or more meta-lenses.

As illustrated in FIG. 14D, an optical system 640 may include three meta-lenses 642a, 642b, and 642c. The meta-lenses 642 may be each designed to provide one or more functionalities such as described in the present disclosure. In this example, the meta-lenses 642a, 642b may be stacked (either as two meta-lens units in a single fabricated meta-lens, or as two separately fabricated meta-lenses). The meta-lens 642c may be at a distance from the meta-lens 642b, or may be positioned against (or stacked on) the meta-lens 642b. Also in this embodiment, the meta-lenses 642a, 642b, 642c may have similar dimensions (e.g., diameter), although in some other embodiments the relative dimensions may be different instead.

Figure 14E:
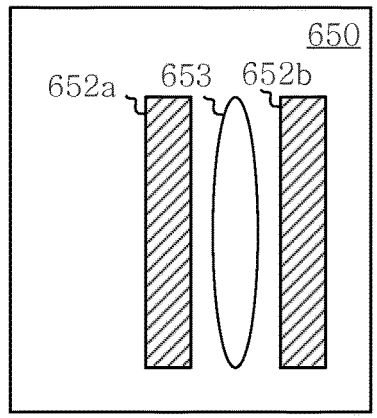
FIG. 14E illustrates an example of an optical system including one or more meta-lenses.

As illustrated in FIG. 14E, an optical system 650 may include meta-lenses 652a, 652b and a lens 653. Each meta-lens 652a, 652b may be designed to provide one or more functionalities such as described in the present disclosure. In this example, the lens 653 may be positioned between the meta-lenses 652a, 652b. The lens 652 may be at distance from one or both meta-lenses 652a, 652b or may be positioned against one or both meta-lenses 652a, 652b. Also in this embodiment, the meta-lenses 652a, 652b and the lens 643 may have similar dimensions (e.g., diameter), although in some other embodiments the relative dimensions may be different instead.

Figure 14F:
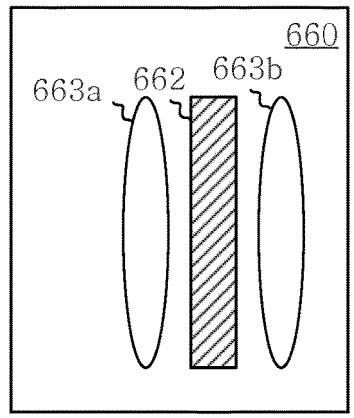
FIG. 14F illustrates an example of an optical system including one or more meta-lenses.

As illustrated in FIG. 14F, an optical system 660 may include a meta-lens 662 and lenses 663a, 663b. The meta-lens 662 may be designed to provide one or more functionalities such as described in the present disclosure. In this example, the meta-lens 662 may be positioned between the lenses 663a, 663b. The meta-lens 662 may be at distance from one or both lenses 663a, 663b or may be positioned against one or both lenses 663a, 663b. Also in this embodiment, the meta-lens 662 and the lenses 663a, 663b may have similar dimensions (e.g., diameter), although in some other embodiments the relative dimensions may be different instead.

Figure 14G:
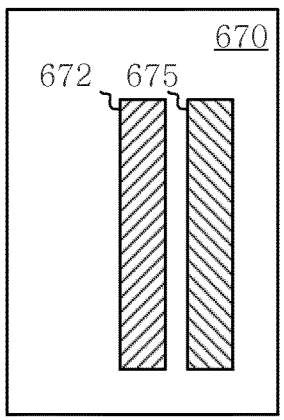
FIG. 14G illustrates an example of an optical system including one or more meta-lenses.

As illustrated in FIG. 14G, an optical system 670 may include a meta-lens 672 and a reflector 675. The meta-lens 672 may be designed to provide one or more functionalities such as described in the present disclosure. In this example, the meta-lens 672 may be positioned in front of a reflector 675 (with respect to a direction of incident light). The meta-lens 672 may be at a distance from the reflector 675, or may be positioned against the reflector 675 to contact the reflector 675. Also in this embodiment, the meta-lens 672 and the reflector 675 may have similar dimensions (e.g., diameter), although in some embodiments the relative dimensions may be different instead.

Figure 14H:
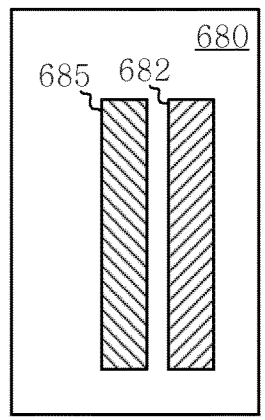
FIG. 14H illustrates an example of an optical system including one or more meta-lenses.

As illustrated in FIG. 14H, an optical system 680 may include a meta-lens 682 and a reflector 685. The meta-lens 682 may be designed to provide one or more functionalities such as described in the present disclosure. In this example, the meta-lens 682 may be positioned behind the reflector 685 (with respect to the direction of incident light), such as in a case in which the reflector 685 is partial reflective, or a case in which the reflector 685 is reflective on both sides. The meta-lens 682 may be at a distance from the reflector 685, or may be positioned against the reflector 685 to contact the reflector 685. Also in this embodiment, the meta-lens 682 and the reflector 685 may have similar dimensions (e.g., diameter), although in some other embodiments the relative dimensions may be different instead.

Figure 14I:
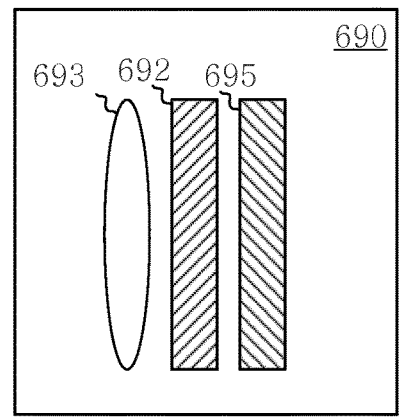
FIG. 14I illustrates an example of an optical system including one or more meta-lenses.

As illustrated in FIG. 14I, an optical system 690 may include a meta-lens 692, a lens 693, and a reflector 695, illustrating that multiple components may be combined with one or more meta-lenses such as meta-lens 692. The meta-lens 692 may be designed to provide one or more functionalities such as described in the present disclosure.

In some embodiments, a meta-lens may have a stacked configuration, where a first substrate with first nanopillars or first nanofins (or other nanostructures) is stacked on a second substrate with second nanopillars or second nanofins (or other nanostructures). Further, in some embodiments, more than two substrates with associated nanostructures may be stacked. Such a stacked configuration may be in a form of two or more meta-lens units in a single fabricated meta-lens, or may be two or more separately fabricated meta-lenses stacked together. In some embodiments, each meta-lens or meta-lens unit has a different phase profile. For example, a first meta-lens or meta-lens unit may have a phase profile designed for a particular focal length, and a second meta-lens or meta-lens unit may have a phase profile designed to correct for aberrations.

Although various examples described and illustrated herein may refer to specific design wavelengths, such as red, green or blue, it is to be understood that a meta-lens may be designed and fabricated for any wavelength in the visible spectrum or outside of the visible spectrum.

Although described herein with respect to transmission of visible light through the meta-lens, in some embodiments, the substrate may be reflective, and the meta-lens is a reflective lens. For example, the nanopillars or the nanofins may be fabricated over a mirror. In some such embodiments, the substrate includes a reflective layer. A material of the substrate may be transmissive (e.g., glass or other transmissive material) with a reflective layer on either side, or the material of the substrate may be non-transmissive, with the reflective layer between the material of the substrate and the nanopillars or the nanofins. A dielectric layer (e.g., a dielectric thin film) may optionally be disposed between the reflective layer and the nanopillars. Examples of a reflective layer may include a metallic layer such as a layer of aluminum, silver, gold, or other metal, or a layer of any other reflective material.

Fabrication of Metasurfaces of Meta-Lenses

In some embodiments, the nanostructures (e.g., nanofins or nanopillars) of the meta-lenses can be fabricated through a fabrication process using atomic layer deposition (ALD) that provides for the formation of high efficiency, visible spectrum dielectric metasurfaces (DMs) having the desirable characteristics disclosed herein in various embodiments of the present disclosure. The fabrication process may implement cleanroom process operations such as lithography and reactive ion etching, reproducibly providing deep subwavelength dielectric units with desired geometries and low loss in the visible spectrum.

In some embodiments, because the fabrication process uses ALD, different dielectric materials can be used to create a DM. For example, metal and non-metal oxides (such as an oxide of aluminum (e.g., $Al_2O_3$), silicon (e.g., $SiO_2$), hafnium (e.g., $HfO_2$), zinc (e.g., ZnO), magnesium (e.g., MgO), or titanium (e.g., $TiO_2$)), metal and non-metal nitrides (such as nitrides of silicon (e.g., $Si_3N_4$), boron (e.g., BN), or tungsten (e.g., WN)), metal and non-metal sulfides, and pure elements can be deposited via ALD. In some embodiments, titanium dioxide ($TiO_2$) may be selected due to its high refractive index and low loss in the visible spectrum, but the fabrication process can use other dielectric materials, such as other dielectric materials selected depending on a desired end application.

In accordance with ALD, one or more deposition cycles may be performed by sequentially exposing a substrate, or a portion of the substrate, to deposition gases of chemical precursors or reactants. The precursors react and form at least a partial layer of a dielectric material on the substrate during a deposition cycle, and further deposition cycles can be performed until a desired thickness is attained. In some embodiments, composite coatings of different dielectric materials also can be formed using ALD.

Figure 15:
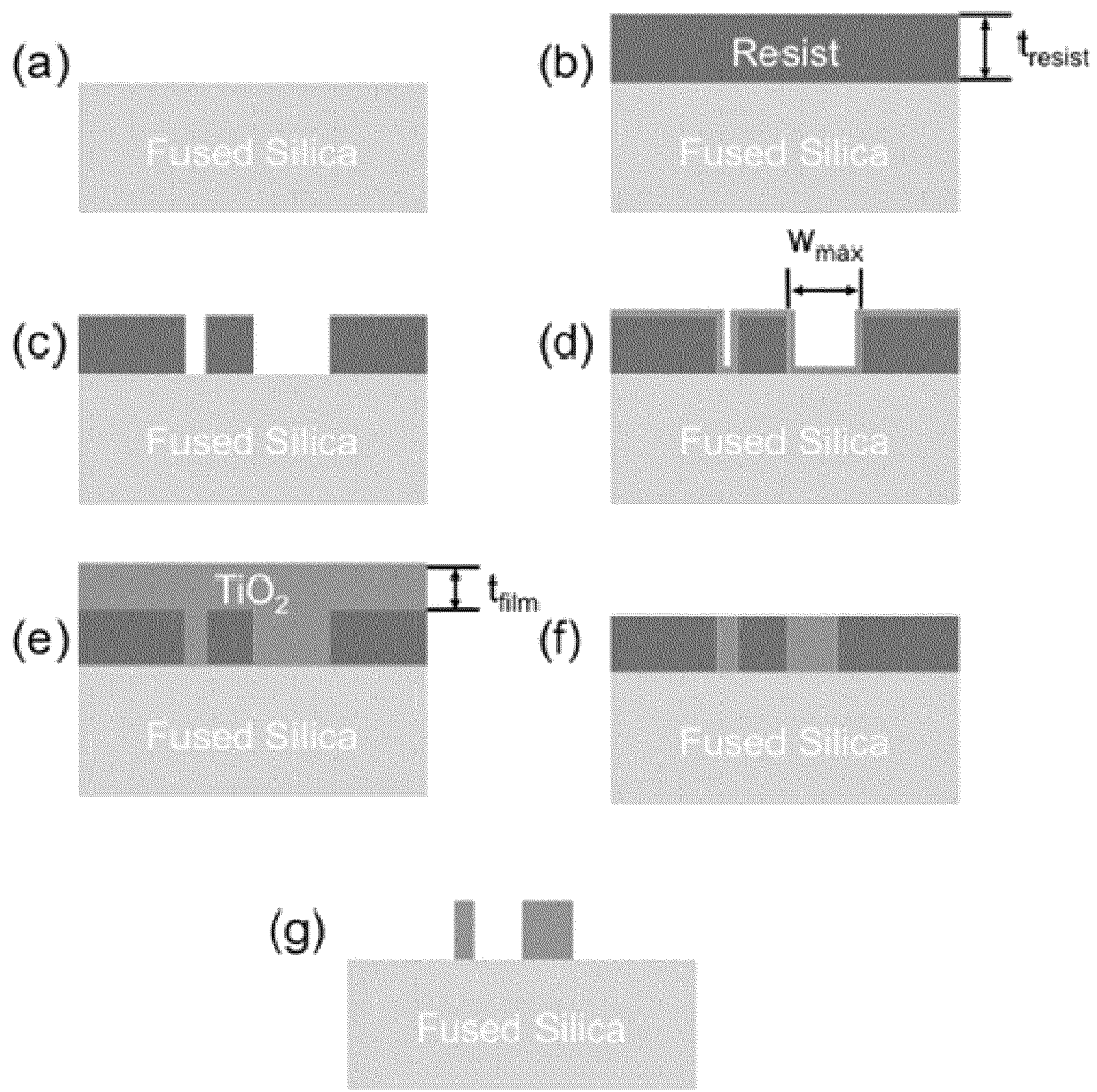
FIG. 15 illustrates a sample fabrication process for forming a visible spectrum dielectric metasurface based on a conformal chemical vapor deposition approach such as atomic layer deposition (ALD).

FIG. 15 illustrates a sample fabrication process for forming a visible spectrum dielectric metasurface based on a conformal chemical vapor deposition approach such as atomic layer deposition (ALD). The process begins with providing a substrate as shown in step a of FIG. 15. The substrate may be transparent in the visible spectrum, such as shown, by way of example, as one including fused silica. Suitable substrates that are transparent in the visible spectrum can have a light transmittance of at least about 40%, at least about 50%, at least about 60%, at least about 70%, at least about 80%, at least about 85%, at least about 90%, or at least about 95%, over the visible spectrum or a design or working wavelength in the visible spectrum.

A resist (e.g., an electron beam resist or a photoresist) is applied (shown in step b of FIG. 15) to the substrate by spinning at a particular rate to set a thickness of a resulting resist layer. The thickness of the resist layer may be a parameter which sets a height of resulting dielectric units in the fabricated DM, and may contribute to a phase of an exiting light, and affects an efficiency of the DM. In general, the spin rate and a viscosity of the resist can be controlled to adjust the thickness of the applied resist layer. As an example, a spin rate of about 5,000 rpm (revolutions per minute) while applying an electron beam resist of a particular viscosity may result in a thickness of a resist layer of about 400 nm.

As shown in step c of FIG. 15, the resist layer is exposed (e.g., using electron beam lithography or photolithography) and developed, forming an inverse pattern for forming the dielectric units. A resulting patterned resist layer is formed with, or defines, gaps, openings, or recesses exposing portions of a surface of the substrate. The openings can have an aspect ratio greater than about one, such as at least about 1.5:1, at least about 2:1, at least about 3:1, at least about 4:1, or at least about 5:1, and up to about 10:1 or greater, or up to about 20:1 or greater.

As shown in step d of FIG. 15, ALD is performed to deposit a film of a dielectric material over the patterned resist layer and the exposed portions of the surface of the substrate. A feature of ALD exploited in the fabrication process to achieve high aspect ratio dielectric units with smooth surfaces may be the conformal nature of the film as it is deposited. Top and sidewall surfaces of the patterned resist layer and the exposed portions of the surface of the substrate can be conformally coated by the dielectric material using ALD. Thus, the film can take on a shape of the openings in the patterned resist layer.

For example, an opening having substantially vertical sidewalls (e.g., substantially perpendicular to a respective exposed portion of the surface of the substrate within the opening) results in a dielectric unit having substantially vertical sidewalls, which allow precise control over a phase of an exiting wavefront with reduced phase errors. By way of comparison, top-down etching techniques can introduce sloped sidewalls, which can lead to phase errors. Further, the conformal coating provides for dielectric units having exceptionally smooth surfaces so as to reduce losses from scattering, such as having a root mean square (RMS) surface roughness of no greater than about 20 nm, no greater than about 15 nm, no greater than about 10 nm, no greater than about 5 nm, no greater than about 4 nm, no greater than about 3 nm, no greater than about 2 nm, or no greater than about 1 nm. By way of comparison, top-down etching techniques can result in undesired sidewall roughness, which can lead to scattering losses.

In accordance with ALD, a first ALD cycle is performed to deposit the dielectric material over the substrate held or housed within a deposition chamber, followed by performing a second ALD cycle to deposit the dielectric material over the substrate, followed by performing a third ALD cycle to deposit the dielectric material over the substrate, and so on until a desired amount of the dielectric material is deposited. In some embodiments, performing each ALD cycle includes exposing the substrate to deposition gases of chemical precursors or reactants. In the case of $TiO_2$ as the dielectric material, a first precursor is a titanium-containing precursor, such as an organometallic compound of titanium, and the second precursor is an oxygen-containing precursor. The first precursor and the second precursor react and form at least a partial layer of the dielectric material over the patterned resist layer and the exposed portions of the surface of the substrate. Accordingly, ALD is used to successively deposit additional dielectric material of the film in a layer-by-layer fashion until the film fills the openings in the patterned resist layer (as shown in step e of FIG. 15). Each deposited layer conformally coats a previously deposited layer.

In the fabrication process of some embodiments, a temperature of the ALD cycles, $T_{ALD}$, may be controlled to be lower than that used for ALD in other contexts. For example, in other contexts, ALD can be used to deposit films at about 150° C. or higher; however, for certain resists, temperatures above about 115° C. can cause a resist to reflow so that a resist pattern deteriorates. Thus, in some embodiments, for the ALD cycles as shown in steps d and e of FIG. 15, the temperature may be controlled or maintained below about 115° C., such as about 110° C. or below, about 105° C. or below, about 100° C. or below, or about 90° C. or below.

In some embodiments, an amount of the dielectric material deposited in the ALD cycles (as shown in parts d and e of FIG. 15) may be a function of a maximum desired feature size (e.g., a feature width or diameter) of a dielectric unit (e.g., $w_{max}$ in step d of FIG. 15). Depending on the pattern of the resist layer, the dielectric film may be deposited to a thickness, $t_{film}$, over the patterned resist layer to achieve the maximum desired feature size. For example, as illustrated in part e of FIG. 15, to obtain a feature width wmax in an opening of the patterned resist layer, $t_{film} > w_{max}/2$, and a top surface of the dielectric film is above the top surface of the patterned resist layer. In some embodiments, tfilm is at least about 50 nm greater than $w_{max}/2$. It is noted that the thickness tfilm corresponds to an amount of the deposited dielectric material that would cover a planar surface with an uniformly thick film of the dielectric material having the thickness $t_{film}$, and corresponds a thickness of a top portion of the dielectric film deposited over the top surface of the patterned resist layer and extending over the openings of the patterned resist layer.

As shown in step f of FIG. 15, blanket etching may be performed to remove the top portion of the dielectric film and expose the top surface of the patterned resist layer and top surfaces of resulting dielectric units disposed in the openings of the patterned resist layer. For example, reactive ion etching may be used, such as using a mixture of $Cl_2$ gas and $BCl_3$ gas, to remove the top portion of the dielectric film to an etch depth substantially equal to the thickness tfilm, although an etch depth greater than the thickness tfilm is also contemplated, such as including removing a top portion of the patterned resist layer via an etch depth of tfilm+about 10 nm. In such fashion, excess dielectric film is removed, and the patterned resist layer (or a residual thereof) is exposed.

As shown in step g of FIG. 15, the patterned resist layer is removed by exposing to a resist removal solvent, leaving high aspect ratio dielectric units of the DM over the substrate, and having an aspect ratio greater than about one, such as at least about 1.5:1, at least about 2:1, at least about 3:1, at least about 4:1, or at least about 5:1, and up to about 10:1 or greater, or up to about 20:1 or greater.

Figure 16A:
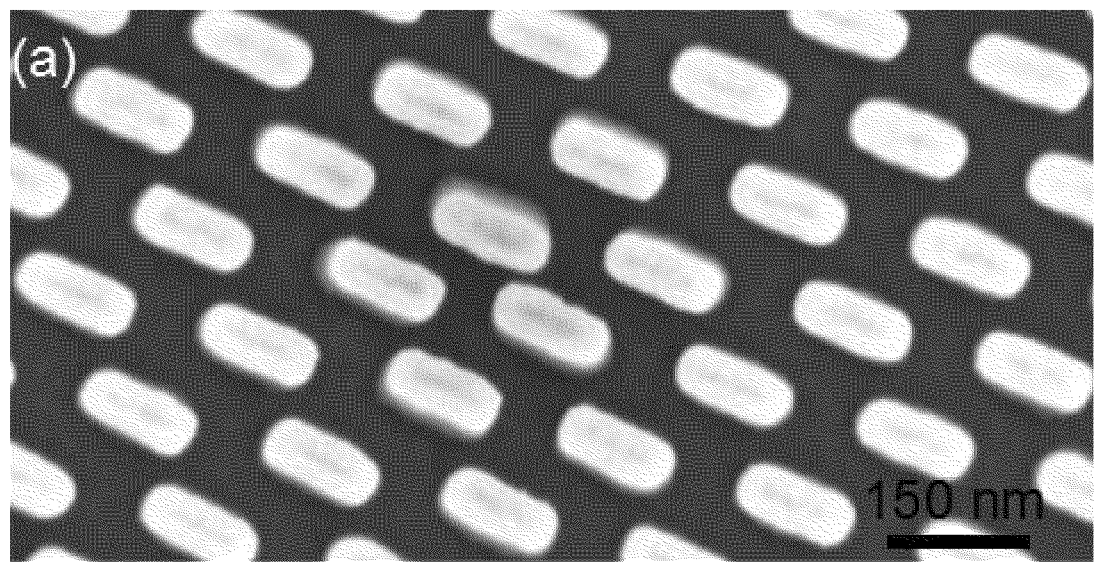
FIG. 16A illustrates a scanning electron microscope (SEM) image of a top view of dielectric units formed using the disclosed fabrication process.

FIG. 16A illustrates a scanning electron microscope (SEM) image of a top view of dielectric units formed using the disclosed fabrication process. The fabrication process can produce arbitrary nanostructures such as nanopillars or nanofins of varying widths, and can attain such widths on a visible spectrum subwavelength scale.

Figure 16B:
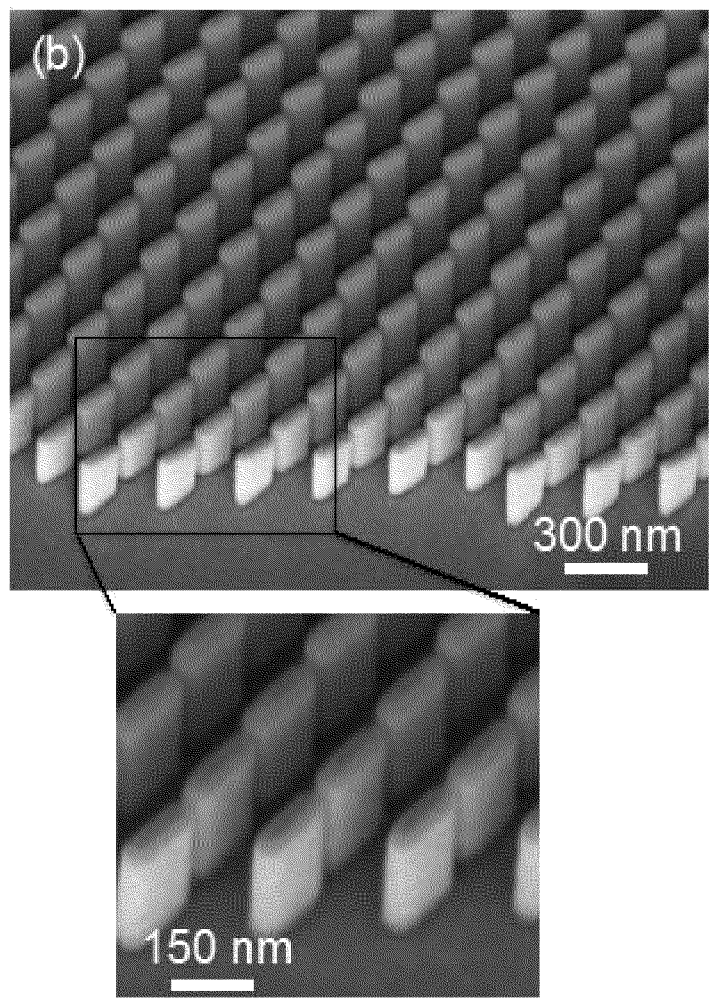
FIG. 16B illustrates a scanning electron microscope (SEM) image of a perspective view of the dielectric units formed using the disclosed fabrication process.

FIG. 16B illustrates a scanning electron microscope (SEM) image of a perspective view of the dielectric units formed using the disclosed fabrication process. The resulting nanostructures may be anisotropic with sidewalls substantially perpendicular to a surface of a substrate. A feature width down to about 25 nm on an about 75 nm pitch (center-to-center spacing between adjacent dielectric units), with a height of the dielectric units from about 100 nm to about 500 nm, can be attained by way of example. Further feature width reduction can be attained with the fabrication process of some embodiments of this disclosure. For example, dielectric units with widths of about 10 nm or less are encompassed by this disclosure.

In some embodiments, dielectric units with high aspect ratios can be attained with the fabrication process. For example, dielectric units with heights up to about 500 nm or greater or up to about 1,000 nm or greater can be attained. In some embodiments, widths of dielectric units are less than a design wavelength of incident light in the visible spectrum, such as no greater than about 400 nm, no greater than about 300 nm, no greater than about 200 nm, no greater than about 150 nm, no greater than about 100 nm, no greater than about 50 nm, about 50 nm to about 200 nm, or about 25 nm to about 200 nm.

In some embodiments, dielectric units can have generally rectangular or other elongated cross-sections (along or projected onto a plane parallel to a surface of a substrate over which the dielectric units are disposed) having a width and a length, and where the length is greater than the width, and the length and the width are less than a design wavelength of incident light in the visible spectrum, such as no greater than about 400 nm, no greater than about 300 nm, no greater than about 200 nm, no greater than about 150 nm, no greater than about 100 nm, no greater than about 50 nm, about 50 nm to about 200 nm, or about 25 nm to about 200 nm.

In some embodiments, dielectric units can have generally circular cross-sections or other even rotationally symmetric cross-section (along or projected onto a plane parallel to a surface of a substrate over which the dielectric units are disposed) having a diameter, and the diameter is less than a design wavelength of incident light in the visible spectrum, such as no greater than about 400 nm, no greater than about 300 nm, no greater than about 200 nm, no greater than about 150 nm, no greater than about 100 nm, no greater than about 50 nm, about 50 nm to about 200 nm, or about 25 nm to about 200 nm. In some embodiments, a pitch of adjacent dielectric units is less than a design wavelength of incident light in the visible spectrum, such as no greater than about 400 nm, no greater than about 300 nm, no greater than about 200 nm, no greater than about 150 nm, no greater than about 100 nm, no greater than about 50 nm, about 50 nm to about 200 nm, or about 25 nm to about 200 nm.

In some embodiments, dielectric units can have substantially consistent widths or diameters along their long axes, such that a width or diameter at a top end of a dielectric unit is substantially the same as a width or diameter at a bottom end of the dielectric unit. It is noted that the above-mentioned dimensions are also applicable for openings of a patterned resist layer within which dielectric units are formed during the fabrication process of some embodiments.

In some embodiments, an approach for creating transmissive dielectric metasurfaces (DMs) may use a bottom-up nanofabrication process via atomic layer deposition, to provide high-aspect-ratio, anisotropic dielectric nanostructures with reduced surface roughness. In some embodiments, $TiO_2$ may be selected as a base material because it has a transparency window ($k \approx 0$) for wavelengths longer than about 360 nm and its inter-band transition lies just outside of the visible spectrum, resulting in a sufficiently high index of refraction for strong light-matter interactions. $TiO_2$ may be deposited by atomic layer deposition (ALD) at about 90° C. with tetrakis(dimethylamido)titanium (TDMAT) as a precursor due to its high deposition rate and absence of defect-driven absorption that may occur with $TiCl_4$-based precursors. Additionally, use of an ALD process offers several advantages. ALD is a self-limiting process providing conformal coverage and monolayer control of a film thickness. The conformal nature of the technique is desirable to produce high aspect ratio nanostructures. The uniform and monolayer coverage yields smooth films with reduced defects compared to those prepared via sputtering or evaporation. Furthermore, the ALD process allows precise control of a material phase of the deposited $TiO_2$, producing amorphous, rutile, or anatase films, depending on the deposition temperature.

The $TiO_2$ films may have surface roughness that is much smaller than the incident wavelength. In some embodiments, a $TiO_2$ film may be deposited on a fused silica substrate. The root mean square (RMS) roughness may be about 0.738 nm, which is on the order of the surface roughness of the underlying substrate. The measured roughness of the amorphous $TiO_2$ is an order of magnitude less than other phases such as polycrystalline rutile or anatase. The latter two phases generally have grain boundaries and RMS roughness as high as about 5-10 nm, both of which can contribute to light-scattering loss.

Figure 17:
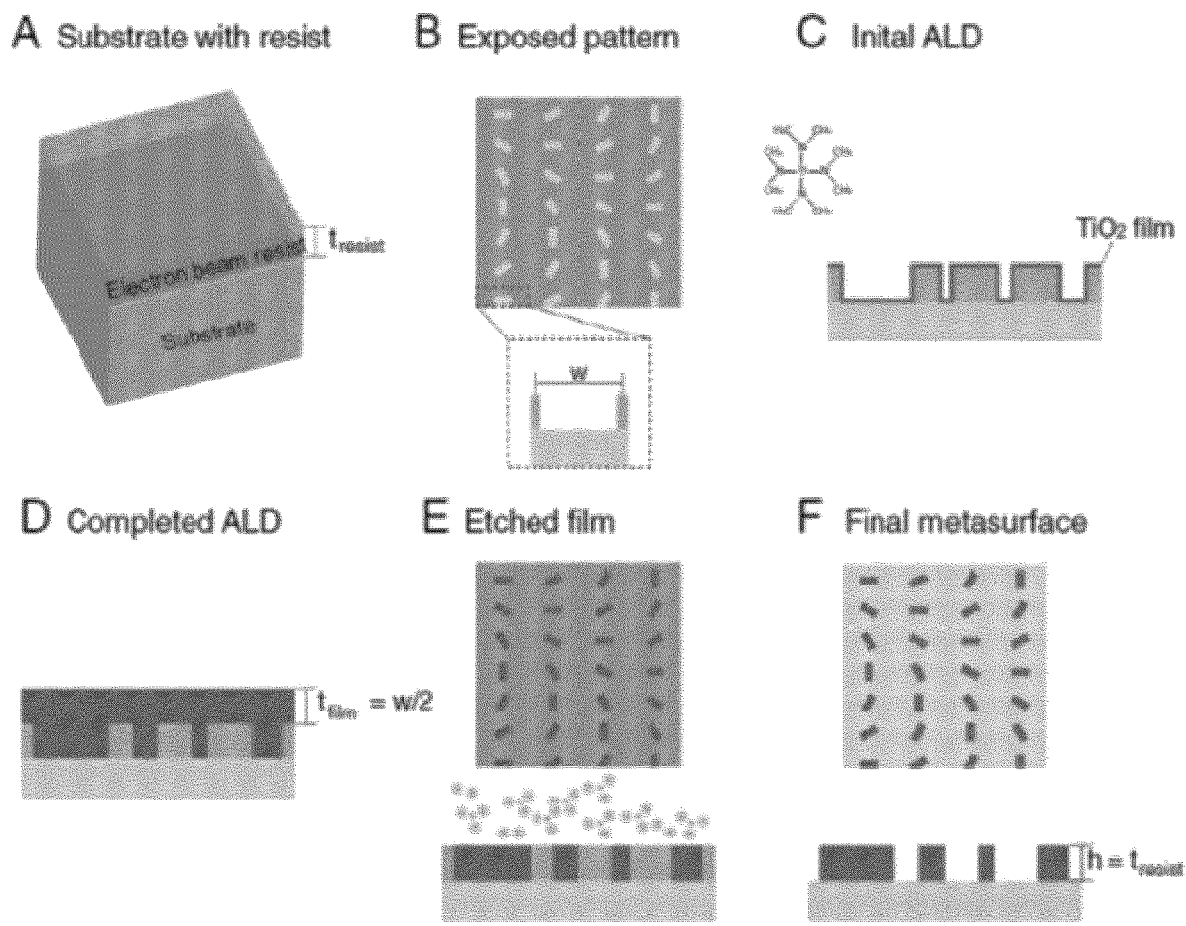
FIG. 17 illustrates a sample fabrication process for forming dielectric metasurfaces.

To achieve highly efficient metasurface devices while preserving the optical properties of ALD-prepared $TiO_2$, the fabrication process shown in FIG. 17 may be used.

As illustrated in step A of FIG. 17, an electron beam resist (EBR) is spun onto a fused silica substrate to produce a layer with thickness, $t_{resist}$. Control of $t_{resist}$ is desired because it sets a height of final nanostructures. The resist is patterned using electron beam lithography and is subsequently developed in solution to remove the exposed EBR. This pattern may be the inverse of a final metasurface.

As illustrated in step B of FIG. 17, the inverse of a final metasurface pattern is imprinted into the EBR by electron beam lithography and subsequent development of the pattern. The boxed area is an expanded cross-section of a maximum feature width, w.

The exposed sample is transferred to an ALD chamber set to about 90° C. The purpose of this temperature is twofold: It produces the desired amorphous phase and keeps the EBR below its glass transition temperature (e.g., prevents deterioration of nanoscale patterns).

As illustrated in step C of FIG. 17, initial $TiO_2$ deposition via ALD conformally coats sidewalls and top of the EBR and exposed substrate. During the deposition, the gaseous $TiO_2$ precursor (Tetrakis(dimethylamido)titanium or TDMAT) coats substantially all exposed surfaces, producing a conformal film on top and sidewalls of the EBR as well as on the exposed fused silica substrate. The ALD process is allowed to reach a specific thickness such that all features are completely filled with $TiO_2$.

As illustrated in step D of FIG. 17, completed deposition of the $TiO_2$ yields a film thickness greater than half the width of the maximum feature size, $t_{film} \geq w/2$. Because the conformal ALD process fills exposed features from both sides, the total ALD film thickness is tfilm≥w/2, where w is a maximum width of all gaps or recesses. In some embodiments, the deposition may be allowed to proceed well beyond the lower threshold of half the feature width to ensure that $TiO_2$ had sufficiently diffused into all pores and that there are no voids in the final nanostructures.

As illustrated in step E of FIG. 17, the residual TiO$_2$ film that coats a top surface of the resist is removed by reactive ion etching the sample in a mixture of BCl$_3$ and Cl$_2$ gas (about 8:2), similar to a planarization technique. The etch depth may be substantially equal to tfilm so that the etching process exposes the underlying resist and the top of the nanostructures. Step E of FIG. 17 shows the exposed tops of the TiO$_2$ metasurface and residual EBR after reactive ion etching with a mixture of Cl$_2$ and BCl$_3$ ions (top and side views).

As illustrated in step F of FIG. 17, the remaining resist is removed to retain the nanostructures that form the metasurface. In this way, nanostructures of heights tresist may be obtained while depositing a film of thickness $t_{film} \approx w/2$, which is time-saving and efficient. Step F of FIG. 17 shows the final dielectric metasurface after removal of remaining EBR (top and side views).

In some embodiments, the approach illustrated in FIG. 17 may be different from liftoff techniques, which generally cannot be used due to a conformal coating of ALD films. In addition, creating high-aspect-ratio nanostructures via dry etching of TiO$_2$, similar to other dielectric materials, may be difficult and can lead to increased sidewall roughness. This ALD process may be also different from techniques where patterns created are generally fixed by a set template (e.g., anodic alumina or inverse opal). Here the ALD process may allow flexibility to form more complex nanostructures because ALD is used directly on an exposed EBR.

As used herein, the singular terms "a," "an," and "the" may include plural referents unless the context clearly dictates otherwise.

Spatial descriptions, such as "above," "below," "up," "left," "right," "down," "top," "bottom," "vertical," "horizontal," "side," "higher," "lower," "upper," "over," "under," and so forth, are indicated with respect to the orientation shown in the figures unless otherwise specified. It should be understood that the spatial descriptions used herein are for purposes of illustration only, and that practical implementations of the structures described herein can be spatially arranged in any orientation or manner, provided that the merits of embodiments of this disclosure are not deviated by such arrangement.

As used herein, the terms "approximately," "substantially," "substantial" and "about" are used to describe and account for small variations. When used in conjunction with an event or circumstance, the terms can refer to instances in which the event or circumstance occurs precisely as well as instances in which the event or circumstance occurs to a close approximation. For example, when used in conjunction with a numerical value, the terms can refer to a range of variation less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, two numerical values can be deemed to be "substantially" the same if a difference between the values is less than or equal to ±10% of an average of the values, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified.

While the present disclosure has been described and illustrated with reference to specific embodiments thereof, these descriptions and illustrations do not limit the present disclosure. It should be understood by those skilled in the art that various changes may be made and equivalents may be substituted without departing from the true spirit and scope of the present disclosure as defined by the appended claims. The illustrations may not be necessarily drawn to scale. There may be distinctions between the artistic renditions in the present disclosure and the actual apparatus due to manufacturing processes and tolerances. There may be other embodiments of the present disclosure which are not specifically illustrated. The specification and drawings are to be regarded as illustrative rather than restrictive. Modifications may be made to adapt a particular situation, material, composition of matter, method, or process to the objective, spirit and scope of the present disclosure. All such modifications are intended to be within the scope of the claims appended hereto. While the methods disclosed herein have been described with reference to particular operations performed in a particular order, it will be understood that these operations may be combined, sub-divided, or re-ordered to form an equivalent method without departing from the teachings of the present disclosure. Accordingly, unless specifically indicated herein, the order and grouping of the operations are not limitations of the present disclosure.

What is claimed is:

1. A meta-lens having a phase profile, comprising:
   a substrate; and
   a plurality of nanostructures disposed on the substrate, wherein each individual nanostructure of the nanostructures imparts a light phase shift that varies depending on a location of the individual nanostructure on the substrate, and the light phase shifts of the nanostructures define the phase profile of the meta-lens;
   wherein the nanostructures include nanopillars, and the light phase shift of each individual nanopillar of the nanopillars depends on the location of the individual nanopillar on the substrate and a structure of the individual nanopillar; and
   wherein the light phase shift of each individual nanopillar of the nanopillars is $$\varphi_t(x, y) = 2\pi - \frac{2\pi}{\lambda_d}(\sqrt{x^2 + y^2 + f^2} - f),$$

where $\lambda_d$ is a design wavelength of the meta-lens and f is a design focal length of the meta-lens.

2. The meta-lens of claim 1, wherein the light phase shift of each individual nanostructure of the nanostructures depends on the location of the individual nanostructure on the substrate and a size or an orientation of the individual nanostructure.

3. The meta-lens of claim 1, wherein the nanostructures are high-aspect-ratio nanostructures.

4. The meta-lens of claim 1, wherein the nanostructures include nanofins, and the light phase shift of each individual nanofin of the nanofins depends on the location of the individual nanofin on the substrate and an orientation of the individual nanofin.

5. The meta-lens of claim 4, wherein an individual nanofin is located at an (x, y) coordinate in an x-y plane of the substrate, the individual nanofin is rotated by an angle with respect to an axis in the x-y plane, and the angle $\theta_{nf}(x, y)$ of the individual nanofin is determined by $$\theta_{nf}(x, y) = \frac{\pi}{\lambda_d}(f - \sqrt{x^2 + y^2 + f^2}),$$

where $\lambda_d$ is a design wavelength of the meta-lens and f is a design focal point of the meta-lens.

6. The meta-lens of claim 5, wherein the phase profile of the meta-lens is an infinity-corrected lens phase profile.

7. The meta-lens of claim 4, wherein each nanofin has a rectangular cross-section, with an aspect ratio of at least about 2:1.

8. The meta-lens of claim 4, wherein each nanofin is formed of a high index dielectric, the index being greater than approximately 2.

9. The meta-lens of claim 8, wherein the high index dielectric is titanium dioxide.

10. The meta-lens of claim 4, wherein a numerical aperture of the meta-lens is less than or equal to 0.8.

11. The meta-lens of claim 4, wherein the meta-lens has a focusing efficiency of greater than about 50% for visible spectrum wavelengths.

12. The meta-lens of claim 4, wherein the meta-lens is configured to resolve features with sub-wavelength gaps of about $$\left(\frac{\lambda}{2 \times NA}\right),$$

where $\lambda$ is a design wavelength of the meta-lens and NA is a numeral aperture of the meta-lens.

13. The meta-lens of claim 1, wherein the light phase shift of the individual nanopillar is realized by adjusting a diameter of the individual nanopillar.

14. The meta-lens of claim 1, wherein a height of the individual nanopillar is greater than a design wavelength of the meta-lens.

15. The meta-lens of claim 1, wherein a unit cell size U of the nanopillar on the substrate meets a criterion of $$\left(U < \frac{\lambda}{2NA}\right),$$

where $\lambda$ is a design wavelength of the meta-lens and NA is a design numerical aperture of the meta-lens.

16. A meta-lens, comprising:
a substrate; and
a plurality of nanostructures disposed on the substrate, wherein each individual nanostructure of the nanostructures imparts a phase profile that varies depending on a location of the individual nanostructure on the substrate and at least one property of the individual nanostructure;
wherein the nanostructures include nanofins, each individual nanofin of the nanofins imparts a phase profile that varies depending on a location of the individual nanofin on the substrate and an orientation of the individual nanofin, and the phase profiles of the nanofins define a polarization sensitive phase profile of the meta-lens.

17. The meta-lens of claim 16, wherein the phase profiles of the nanostructures that vary are realized by varying orientations of the nanostructures, sizes of the nanostructures, aspect ratios of the nanostructures, materials of the nanostructures, spatial arrangement of the nanostructures, shapes of the nanostructures, or a combination of two or more thereof.

18. The meta-lens of claim 16, wherein the meta-lens has a phase profile of a spherical lens, an infinity-corrected lens, a point-to-point lens, or a bi-convex lens.

19. The meta-lens of claim 16, wherein the nanostructures include nanopillars, each individual nanopillar of the nanopillars imparts a phase profile that varies depending on a location of the individual nanopillar on the substrate and a diameter of the individual nanopillar, and the phase profiles of the nanopillars define a polarization insensitive phase profile of the meta-lens.

20. An optical system, comprising:
an optical component; and
a first planar meta-lens optically coupled to the optical component, the first planar meta-lens including:
a first substrate, and
a plurality of first nanostructures disposed on the first substrate, wherein each individual first nanostructure of the first nanostructures imparts a phase profile that varies depending on a location of the individual first nanostructure on the first substrate and at least one property of the individual first nanostructure;
wherein the plurality of first nanostructures include nanofins, each individual nanofin of the nanofins imparts a phase profile that varies depending on a location of the individual nanofin on the first substrate and an orientation of the individual nanofin, and the phase profiles of the nanofins define a polarization sensitive phase profile of the meta-lens.

21. The optical system of claim 20, wherein the optical component is a second planar meta-lens, the second planar meta-lens including:
a second substrate, and
a plurality of second nanostructures disposed on the second substrate, wherein each individual second nanostructure of the second nanostructures imparts a phase profile that varies depending on a location of the individual second nanostructure on the second substrate and at least one property of the individual second nanostructure.

22. The optical system of claim 21, wherein the second substrate with the second nanostructures is stacked on the first substrate with the first nanostructures, and a phase profile of the first planar meta-lens is different from a phase profile of the second planar meta-lens.

23. The optical system of claim 21, wherein the second planar meta-lens is configured to correct for an aberration of the first planar meta-lens.

* * * * *